United States Patent
Kim et al.

(10) Patent No.: US 10,638,477 B2
(45) Date of Patent: *Apr. 28, 2020

(54) METHOD AND APPARATUS FOR TRANSMITTING AND RECEIVING SYSTEM INFORMATION

(71) Applicant: LG Electronics Inc., Seoul (KR)

(72) Inventors: Youngsub Kim, Seoul (KR); Hyunsoo Ko, Seoul (KR); Kijun Kim, Seoul (KR); Sukhyon Yoon, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/529,222

(22) Filed: Aug. 1, 2019

(65) Prior Publication Data
US 2019/0357211 A1 Nov. 21, 2019

Related U.S. Application Data

(63) Continuation of application No. 16/193,830, filed on Nov. 16, 2018.

(60) Provisional application No. 62/587,497, filed on Nov. 17, 2017.

(51) Int. Cl.
| | |
|---|---|
| *H04W 72/04* | (2009.01) |
| *H04W 56/00* | (2009.01) |
| *H04W 74/00* | (2009.01) |
| *H04W 48/10* | (2009.01) |
| *H04L 5/00* | (2006.01) |

(52) U.S. Cl.
CPC ......... *H04W 72/0446* (2013.01); *H04L 5/00* (2013.01); *H04W 48/10* (2013.01); *H04W 56/00* (2013.01); *H04W 74/006* (2013.01)

(58) Field of Classification Search
None
See application file for complete search history.

(56) References Cited

U.S. PATENT DOCUMENTS

| | | | |
|---|---|---|---|
| 2018/0167946 A1 | 6/2018 | Si et al. | |
| 2019/0104554 A1* | 4/2019 | Amuru | H04W 72/042 |
| 2019/0132882 A1* | 5/2019 | Li | H04W 74/0833 |

OTHER PUBLICATIONS

Catt, R1-1717799, Remaining details on RMSI, 3GPP TSG RAN WG1 #90bis, 3GPP(Oct. 3, 2017) See section 1, section 2.2, sectioin 2.5.

(Continued)

*Primary Examiner* — Mansour Oveissi
(74) *Attorney, Agent, or Firm* — Fish & Richardson P.C.

(57) ABSTRACT

Disclosed herein is a method for receiving remaining minimum system information (RMSI) by a user equipment (UE) in a wireless communication system. The method includes receiving an synchronization signal (SS)/physical broadcast channel (PBCH) block including an SS and a PBCH in a half-frame, obtaining, via the PBCH, information related to a monitoring window for receiving a physical downlink control channel (PDCCH) for the RMSI, receiving the PDCCH within the monitoring window, and receiving the RMSI based on the PDCCH, wherein monitoring windows related to SS/PBCH blocks having consecutive indexes among SS/PBCH blocks receivable in the half-frame are at least partially overlapped each other.

20 Claims, 19 Drawing Sheets

(56) References Cited

OTHER PUBLICATIONS

NTT DOCOMO, INC., R1-1718181, Discussion on remaining details on RMSI delivery, 3GPP TSG RAN WG1 #90bis, 3GPP (Oct. 3, 2017) See section 2.4, section 2.5, fig.1.
CMCC, R1-1716044, Common CORESET design for RMSI scheduling, 3GPP TSG RAN WG1 #AH, 3GPP (Sep. 12, 2017) See section 2.
Fujitsu, R1-1710233, Discussion on the CO RESET for RMSI delivery, 3GPP TSG RAN WG1 #AH, 3GPP (Jun. 16, 2017) See section 2.
3GPP Rani #90BI5 Meeting Oct. 9-13 2017 (Year: 2017).
Catt, "Offline summary for AI 7.1.2.2 Remaining details on Remaining Minimum System Information," R1-1719198, 3GPP TSG RAN WG1 Meeting 90bis, Prague, CZ, Oct. 9-13, 2017, 15 pages.
Catt, "Offline summary for AI 7.1.2.2 Remaining details on Remaining Minimum System Information," R1-1719145, 3GPP TSG RAN WG1 Meeting 90bis, Prague, CZ, Oct. 9-13, 2017, 15 pages.

\* cited by examiner

FIG. 1
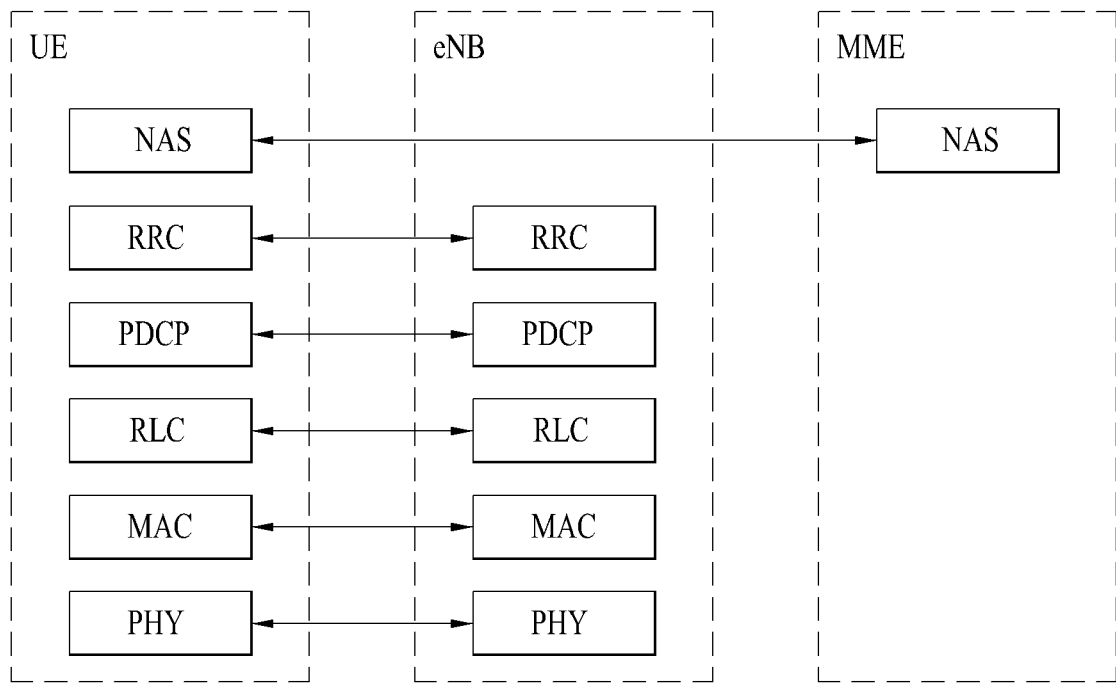
(A) CONTROL-PLANE PROTOCOL STACK
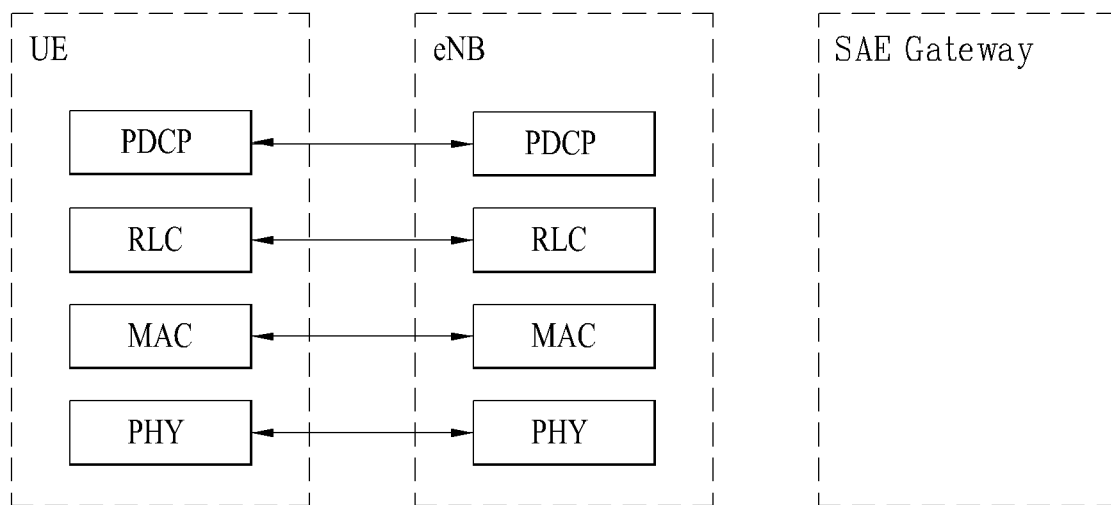
(B) USER-PLANE PROTOCOL STACK

FIG. 17
Example of 4 slots for monitoring window duration
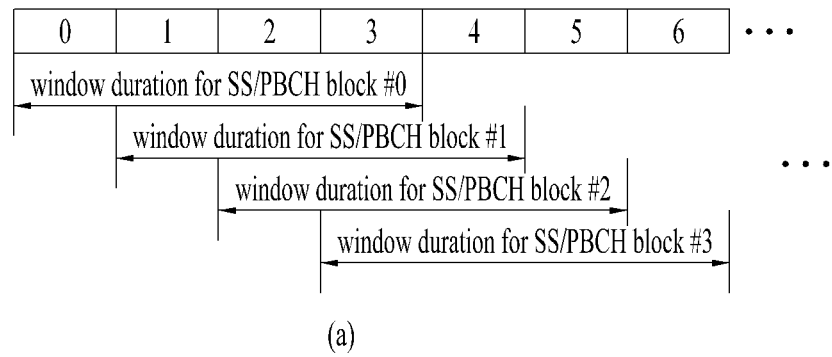
(a)
Example of 4 slots for monitoring window duration
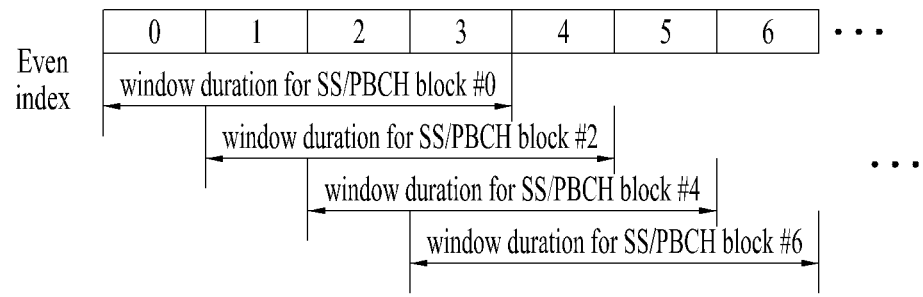
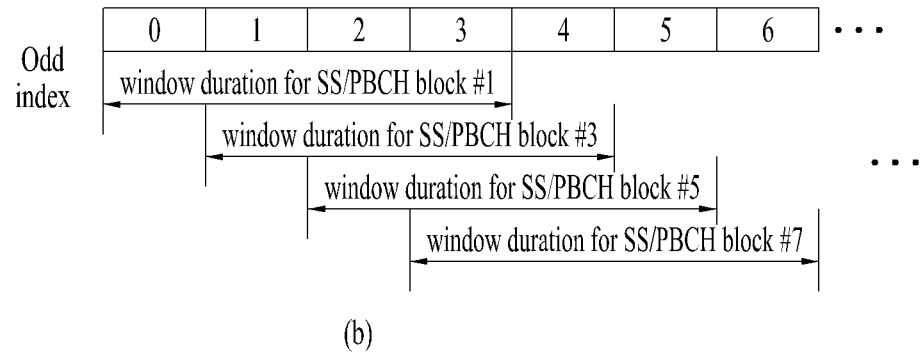
(b)

FIG. 18
Example of 4 slots for monitoring window duration
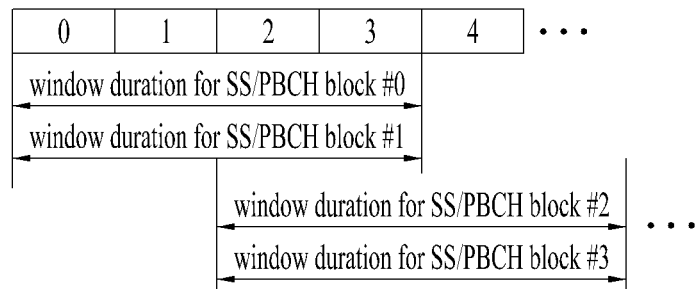
(a)
Example of 4 slots for monitoring window duration
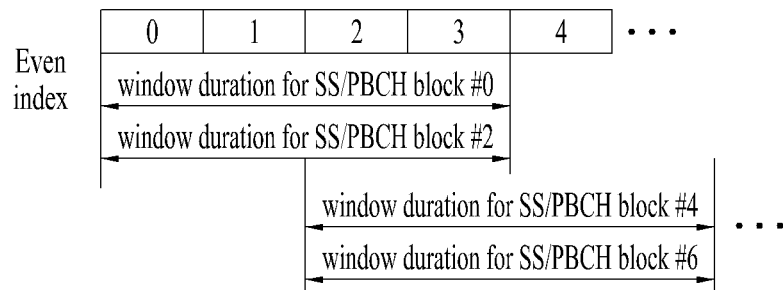
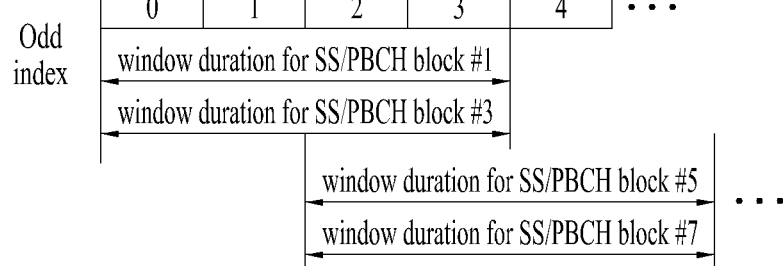
(b)

METHOD AND APPARATUS FOR TRANSMITTING AND RECEIVING SYSTEM INFORMATION

CROSS-REFERENCE TO RELATED APPLICATIONS

The present application is a continuation of U.S. application Ser. No. 16/193,830, filed on Nov. 16, 2018, which claims priority to U.S. Provisional Application No. 62/587,497, filed on Nov. 17, 2017. The disclosures of the prior applications are incorporated by reference in their entirety.

TECHNICAL FIELD

The present invention relates to a method and apparatus for transmitting and receiving system information, and more particularly, to a method and apparatus for configuring a monitoring window of a physical downlink control channel (PDCCH).

BACKGROUND ART

As more and more communication devices demand larger communication traffic along with the current trends, a future-generation $5^{th}$ generation (5G) system is required to provide an enhanced wireless broadband communication, compared to the legacy LTE system. In the future-generation 5G system, communication scenarios are divided into enhanced mobile broadband (eMBB), ultra-reliability and low-latency communication (URLLC), massive machine-type communication (mMTC), and so on.

Herein, eMBB is a future-generation mobile communication scenario characterized by high spectral efficiency, high user experienced data rate, and high peak data rate, URLLC is a future-generation mobile communication scenario characterized by ultra high reliability, ultra low latency, and ultra high availability (e.g., vehicle to everything (V2X), emergency service, and remote control), and mMTC is a future-generation mobile communication scenario characterized by low cost, low energy, short packet, and massive connectivity (e.g., Internet of things (IoT)).

DISCLOSURE

Technical Problem

An object of the present invention devised to solve the problem lies in a method and apparatus for transmitting and receiving system information.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

The object of the present invention can be achieved by providing a method for receiving remaining minimum system information (RMSI) by a user equipment (UE) in a wireless communication system, the method including receiving an synchronization signal (SS)/physical broadcast channel (PBCH) block including an SS and a PBCH in a half-frame, obtaining, via the PBCH, information related to a monitoring window for receiving a physical downlink control channel (PDCCH) for the RMSI, receiving the PDCCH within the monitoring window, and receiving the RMSI based on the PDCCH, wherein monitoring windows related to SS/PBCH blocks having consecutive indexes among SS/PBCH blocks receivable in the half-frame are at least partially overlapped each other.

Herein, when a control resource set (CORESET) for a RMSI is included in a slot, the monitoring windows related to the SS/PBCH blocks having the consecutive indexes are partially overlapped each other.

When two control resource sets (CORESETs) for a RMSI are included in a slot, a monitoring window related to an SS/PBCH block having index 2n is completely overlapped with a monitoring window related to an SS/PBCH block having index 2n+1, wherein n may be a non-negative integer.

In addition, the monitoring window related to the SS/PBCH block having the index 2n+1 is partially overlapped with a monitoring window related to an SS/PBCH block having index 2n+2.

A period of the monitoring window may be the same as a default transmission period of the SS/PBCH block.

A duration of the monitoring window may be 1 slot, 2 slots or 4 slots.

In another aspect of the present invention, provided herein is a communication apparatus for receiving remaining minimum system information (RMSI) in a wireless communication system, the communication apparatus including a memory, and a processor connected to the memory, wherein the processor is configured to control to receive an synchronization signal (SS)/physical broadcast channel (PBCH) block including an SS and a PBCH in a half-frame, obtain, via the PBCH, information related to a monitoring window for receiving a physical downlink control channel (PDCCH) for the RMSI, receive the PDCCH within the monitoring window, and receive the RMSI based on the PDCCH, wherein monitoring windows related to SS/PBCH blocks having consecutive indexes among SS/PBCH blocks receivable in the half-frame are at least partially overlapped each other.

Herein, when a control resource set (CORESET) for a RMSI is included in a slot, the monitoring windows related to the SS/PBCH blocks having the consecutive indexes may be partially overlapped each other.

When two control resource sets (CORESETs) for a RMSI are included in a slot, a monitoring window related to an SS/PBCH block having index 2n may be completely overlapped with a monitoring window related to an SS/PBCH block having index 2n+1, wherein n may be a non-negative integer.

In addition, the monitoring window related to the SS/PBCH block having the index 2n+1 may be partially overlapped with a monitoring window related to an SS/PBCH block having index 2n+2.

A period of the monitoring window may be the same as a default transmission period of the SS/PBCH block.

A duration of the monitoring window may be 1 slot, 2 slots or 4 slots.

In another aspect of the present invention, provided herein is a method for transmitting remaining minimum system information (RMSI) by a base station in a wireless communication system, the method including receiving an synchronization signal (SS)/physical broadcast channel (PBCH) block including an SS and a PBCH in a half-frame, transmitting a physical downlink control channel (PDCCH) for the RMSI based on information related to a monitoring window delivered through the PBCH, and transmitting the RSMI based on the PDCCH, wherein monitoring windows related to SS/PBCH blocks having consecutive indexes among SS/PBCH blocks receivable in the half-frame may be at least partially overlapped each other.

Advantageous Effects

According to the present invention, in an environment where a plurality of SS/PBCH blocks may be transmitted, a monitoring window of a remaining minimum system information (RMSI) physical downlink control channel (PDCCH) corresponding to each SS/PBCH block may be efficiently configured.

It will be appreciated by persons skilled in the art that the effects that can be achieved with the present disclosure are not limited to what has been particularly described hereinabove and other effects of the present disclosure will be more clearly understood from the following detailed description taken in conjunction with the accompanying drawings.

BRIEF DESCRIPTION OF THE DRAWINGS

FIG. 1 is a view illustrating the control-plane and user-plane architecture of radio interface protocols between a user equipment (UE) and an evolved UMTS terrestrial radio access network (E-UTRAN) in conformance to a $3^{rd}$ generation partnership project (3GPP) radio access network standard.

FIGS. 15 to 18 are views illustrating a method of configuring an RMSI PDCCH monitoring window according to an embodiment of the present invention.

BEST MODE FOR CARRYING OUT THE INVENTION

Figure 2:
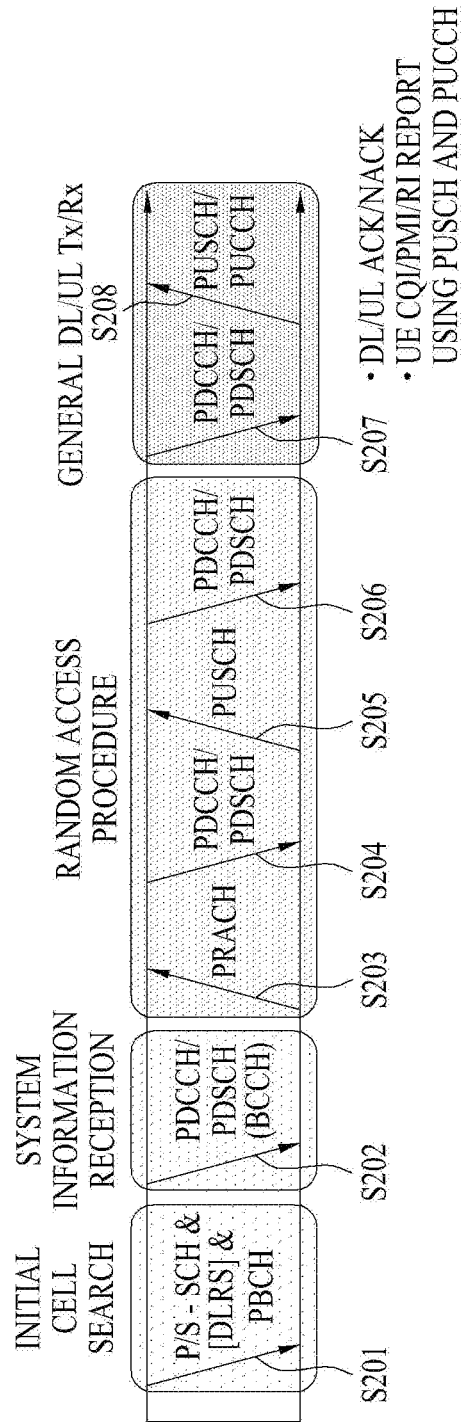
FIG. 2 is a view illustrating physical channels and a general signal transmission method using the physical channels in a 3GPP system.

The configuration, operation, and other features of the present disclosure will readily be understood with embodiments of the present disclosure described with reference to the attached drawings. Embodiments of the present disclosure as set forth herein are examples in which the technical features of the present disclosure are applied to a $3^{rd}$ generation partnership project (3GPP) system.

While embodiments of the present disclosure are described in the context of long term evolution (LTE) and LTE-advanced (LTE-A) systems, they are purely exemplary. Therefore, the embodiments of the present disclosure are applicable to any other communication system as long as the above definitions are valid for the communication system.

The term, Base Station (BS) may be used to cover the meanings of terms including remote radio head (RRH), evolved Node B (eNB or eNode B), transmission point (TP), reception point (RP), relay, and so on.

The 3GPP communication standards define downlink (DL) physical channels corresponding to resource elements (REs) carrying information originated from a higher layer, and DL physical signals which are used in the physical layer and correspond to REs which do not carry information originated from a higher layer. For example, physical downlink shared channel (PDSCH), physical broadcast channel (PBCH), physical multicast channel (PMCH), physical control format indicator channel (PCFICH), physical downlink control channel (PDCCH), and physical hybrid ARQ indicator channel (PHICH) are defined as DL physical channels, and reference signals (RSs) and synchronization signals (SSs) are defined as DL physical signals. An RS, also called a pilot signal, is a signal with a predefined special waveform known to both a gNode B (gNB) and a UE. For example, cell specific RS, UE-specific RS (UE-RS), positioning RS (PRS), and channel state information RS (CSI-RS) are defined as DL RSs. The 3GPP LTE/LTE-A standards define uplink (UL) physical channels corresponding to REs carrying information originated from a higher layer, and UL physical signals which are used in the physical layer and correspond to REs which do not carry information originated from a higher layer. For example, physical uplink shared channel (PUSCH), physical uplink control channel (PUCCH), and physical random access channel (PRACH) are defined as UL physical channels, and a demodulation reference signal (DMRS) for a UL control/data signal, and a sounding reference signal (SRS) used for UL channel measurement are defined as UL physical signals.

In the present disclosure, the PDCCH/PCFICH/PHICH/PDSCH refers to a set of time-frequency resources or a set of REs, which carry downlink control information (DCI)/a control format indicator (CFI)/a DL acknowledgement/negative acknowledgement (ACK/NACK)/DL data. Further, the PUCCH/PUSCH/PRACH refers to a set of time-frequency resources or a set of REs, which carry UL control information (UCI)/UL data/a random access signal. In the present disclosure, particularly a time-frequency resource or an RE which is allocated to or belongs to the PDCCH/PCFICH/PHICH/PDSCH/PUCCH/PUSCH/PRACH is referred to as a PDCCH RE/PCFICH RE/PHICH RE/PDSCH RE/PUCCH RE/PUSCH RE/PRACH RE or a PDCCH resource/PCFICH resource/PHICH resource/PDSCH resource/PUCCH resource/PUSCH resource/PRACH resource. Hereinbelow, if it is said that a UE transmits a PUCCH/PUSCH/PRACH, this means that UCI/UL data/a random access signal is transmitted on or through the PUCCH/PUSCH/PRACH. Further, if it is said that a gNB transmits a PDCCH/PCFICH/PHICH/PDSCH, this means that DCI/control information is transmitted on or through the PDCCH/PCFICH/PHICH/PDSCH.

Hereinbelow, an orthogonal frequency division multiplexing (OFDM) symbol/carrier/subcarrier/RE to which a CRS/DMRS/CSI-RS/SRS/UE-RS is allocated to or for which the CRS/DMRS/CSI-RS/SRS/UE-RS is configured is referred to as a CRS/DMRS/CSI-RS/SRS/UE-RS symbol/carrier/subcarrier/RE. For example, an OFDM symbol to which a tracking RS (TRS) is allocated or for which the TRS is configured is referred to as a TRS symbol, a subcarrier to which a TRS is allocated or for which the TRS is configured is referred to as a TRS subcarrier, and an RE to which a TRS is allocated or for which the TRS is configured is referred to as a TRS RE. Further, a subframe configured to transmit a TRS is referred to as a TRS subframe. Further, a subframe carrying a broadcast signal is referred to as a broadcast subframe or a PBCH subframe, and a subframe carrying a synchronization signal (SS) (e.g., a primary synchronization signal (PSS) and/or a secondary synchronization signal (SSS)) is referred to as an SS subframe or a PSS/SSS subframe. An OFDM symbol/subcarrier/RE to which a PSS/SSS is allocated or for which the PSS/SSS is configured is referred to as a PSS/SSS symbol/subcarrier/RE.

In the present disclosure, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna port configured to transmit CRSs may be distinguished from each other by the positions of REs occupied by the CRSs according to CRS ports, antenna ports configured to transmit UE-RSs may be distinguished from each other by the positions of REs occupied by the UE-RSs according to UE-RS ports, and antenna ports configured to transmit CSI-RSs may be distinguished from each other by the positions of REs occupied by the CSI-RSs according to CSI-RS ports. Therefore, the term CRS/UE-RS/CSI-RS/TRS port is also used to refer to a pattern of REs occupied by a CRS/UE-RS/CSI-RS/TRS in a predetermined resource area.

FIG. 1 illustrates control-plane and user-plane protocol stacks in a radio interface protocol architecture conforming to a 3GPP wireless access network standard between a user equipment (UE) and an evolved UMTS terrestrial radio access network (E-UTRAN). The control plane is a path in which the UE and the E-UTRAN transmit control messages to manage calls, and the user plane is a path in which data generated from an application layer, for example, voice data or Internet packet data is transmitted.

A physical (PHY) layer at layer 1 (L1) provides information transfer service to its higher layer, a medium access control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in orthogonal frequency division multiple access (OFDMA) for downlink (DL) and in single carrier frequency division multiple access (SC-FDMA) for uplink (UL).

The MAC layer at layer 2 (L2) provides service to its higher layer, a radio link control (RLC) layer via logical channels. The RLC layer at L2 supports reliable data transmission. RLC functionality may be implemented in a function block of the MAC layer. A packet data convergence protocol (PDCP) layer at L2 performs header compression to reduce the amount of unnecessary control information and thus efficiently transmit Internet protocol (IP) packets such as IP version 4 (IPv4) or IP version 6 (IPv6) packets via an air interface having a narrow bandwidth.

A radio resource control (RRC) layer at the lowest part of layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

DL transport channels used to deliver data from the E-UTRAN to UEs include a broadcast channel (BCH) carrying system information, a paging channel (PCH) carrying a paging message, and a shared channel (SCH) carrying user traffic or a control message. DL multicast traffic or control messages or DL broadcast traffic or control messages may be transmitted on a DL SCH or a separately defined DL multicast channel (MCH). UL transport channels used to deliver data from a UE to the E-UTRAN include a random access channel (RACH) carrying an initial control message and a UL SCH carrying user traffic or a control message. Logical channels that are defined above transport channels and mapped to the transport channels include a broadcast control channel (BCCH), a paging control channel (PCCH), a Common Control Channel (CCCH), a multicast control channel (MCCH), a multicast traffic channel (MTCH), etc.

FIG. 2 illustrates physical channels and a general method for transmitting signals on the physical channels in the 3GPP system.

Referring to FIG. 2, when a UE is powered on or enters a new cell, the UE performs initial cell search (S201). The initial cell search involves acquisition of synchronization to an eNB. Specifically, the UE synchronizes its timing to the eNB and acquires a cell identifier (ID) and other information by receiving a primary synchronization channel (P-SCH) and a secondary synchronization channel (S-SCH) from the eNB. Then the UE may acquire information broadcast in the cell by receiving a physical broadcast channel (PBCH) from the eNB. During the initial cell search, the UE may monitor a DL channel state by receiving a DownLink reference signal (DL RS).

After the initial cell search, the UE may acquire detailed system information by receiving a physical downlink control channel (PDCCH) and receiving a physical downlink shared channel (PDSCH) based on information included in the PDCCH (S202).

If the UE initially accesses the eNB or has no radio resources for signal transmission to the eNB, the UE may perform a random access procedure with the eNB (S203 to S206). In the random access procedure, the UE may transmit a predetermined sequence as a preamble on a physical random access channel (PRACH) (S203 and S205) and may receive a response message to the preamble on a PDCCH and a PDSCH associated with the PDCCH (S204 and S206). In the case of a contention-based RACH, the UE may additionally perform a contention resolution procedure.

After the above procedure, the UE may receive a PDCCH and/or a PDSCH from the eNB (S207) and transmit a physical uplink shared channel (PUSCH) and/or a physical uplink control channel (PUCCH) to the eNB (S208), which is a general DL and UL signal transmission procedure. Particularly, the UE receives downlink control information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL acknowledgment/negative acknowledgment (ACK/NACK) signal, a channel quality indicator (CQI), a precoding matrix index (PMI), a rank indicator (RI), etc. In the 3GPP LTE system, the UE may transmit control information such as a CQI, a PMI, an RI, etc. on a PUSCH and/or a PUCCH.

Figure 3:
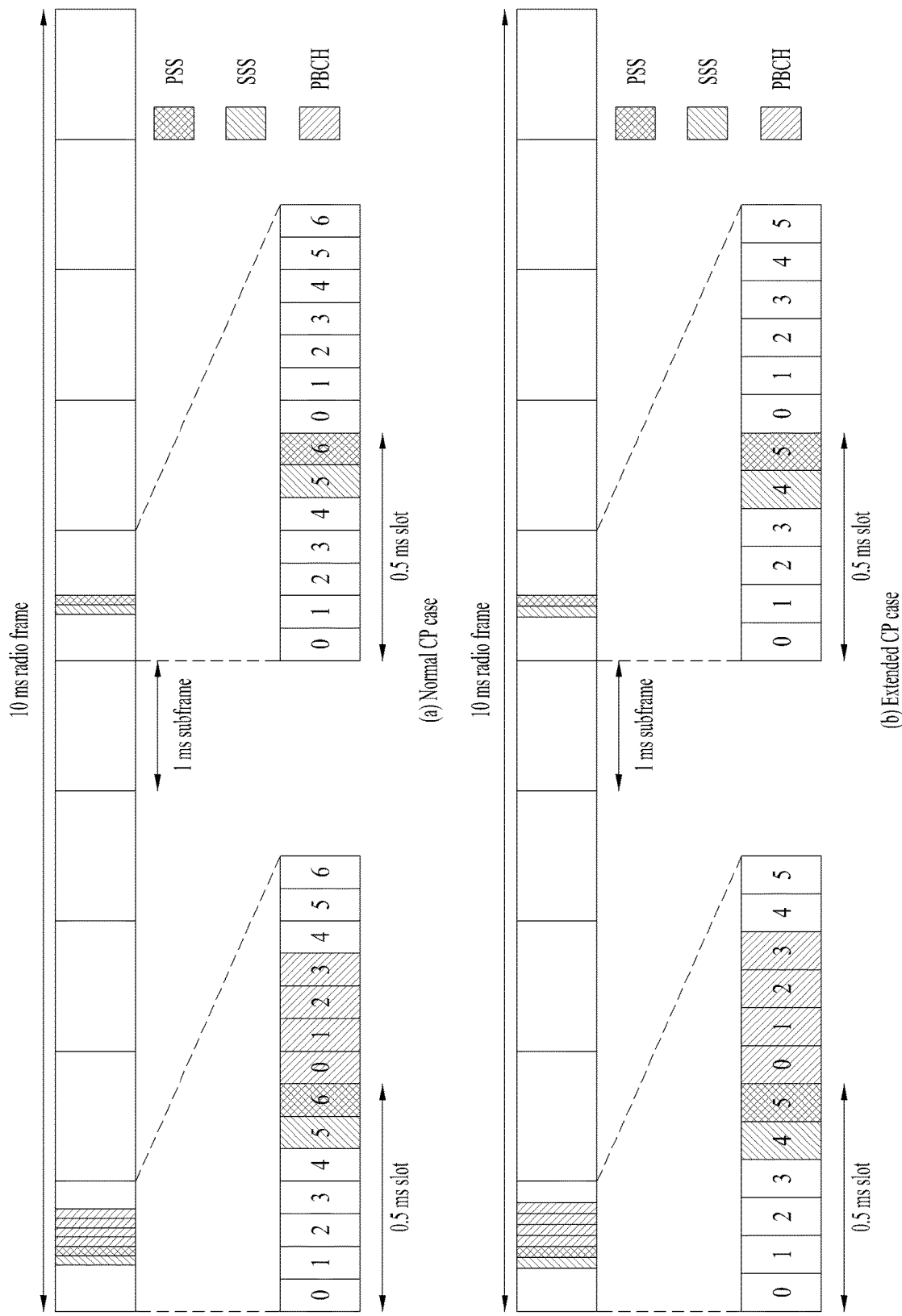
FIG. 3 is a view illustrating a radio frame structure for transmitting a synchronization signal (SS) in a long term evolution (LTE) system.

FIG. 3 is a diagram illustrating a radio frame structure for transmitting a synchronization signal (SS) in LTE system. In particular, FIG. 3 illustrates a radio frame structure for transmitting a synchronization signal and PBCH in frequency division duplex (FDD). FIG. 3($a$) shows positions at which the SS and the PBCH are transmitted in a radio frame configured by a normal cyclic prefix (CP) and FIG. 3($b$) shows positions at which the SS and the PBCH are transmitted in a radio frame configured by an extended CP.

An SS will be described in more detail with reference to FIG. 3. An SS is categorized into a primary synchronization signal (PSS) and an secondary synchronization signal (SSS). The PSS is used to acquire time-domain synchronization such as OFDM symbol synchronization, slot synchronization, etc. and/or frequency-domain synchronization. And, the SSS is used to acquire frame synchronization, a cell group ID, and/or a CP configuration of a cell (i.e. information indicating whether to a normal CP or an extended is used). Referring to FIG. 3, a PSS and an SSS are transmitted through two OFDM symbols in each radio frame. Particularly, the SS is transmitted in first slot in each of subframe 0 and subframe 5 in consideration of a GSM (Global System for Mobile communication) frame length of 4.6 ms for facilitation of inter-radio access technology (inter-RAT) measurement. Especially, the PSS is transmitted in a last OFDM symbol in each of the first slot of subframe 0 and the first slot of subframe 5. And, the SSS is transmitted in a second to last OFDM symbol in each of the first slot of subframe 0 and the first slot of subframe 5. Boundaries of a corresponding radio frame may be detected through the SSS. The PSS is transmitted in the last OFDM symbol of the corresponding slot and the SSS is transmitted in the OFDM symbol immediately before the OFDM symbol in which the PSS is transmitted. According to a transmission diversity scheme for the SS, only a single antenna port is used. However, the transmission diversity scheme for the SS standards is not separately defined in the current standard.

Referring to FIG. 3, by detecting the PSS, a UE may know that a corresponding subframe is one of subframe 0 and subframe 5 since the PSS is transmitted every 5 ms but the UE cannot know whether the subframe is subframe 0 or subframe 5. That is, frame synchronization cannot be obtained only from the PSS. The UE detects the boundaries of the radio frame in a manner of detecting an SSS which is transmitted twice in one radio frame with different sequences.

Having demodulated a DL signal by performing a cell search procedure using the PSS/SSS and determined time and frequency parameters necessary to perform UL signal transmission at an accurate time, a UE can communicate with an eNB only after obtaining system information necessary for a system configuration of the UE from the eNB.

The system information is configured with a master information block (MIB) and system information blocks (SIBs). Each SIB includes a set of functionally related parameters and is categorized into an MIB, SIB Type 1 (SIB1), SIB Type 2 (SIB2), and SIB3 to SIB8 according to the included parameters.

The MIB includes most frequently transmitted parameters which are essential for a UE to initially access a network served by an eNB. The UE may receive the MIB through a broadcast channel (e.g. a PBCH). The MIB includes a downlink system bandwidth (DL BW), a PHICH configuration, and a system frame number (SFN). Thus, the UE can explicitly know information on the DL BW, SFN, and PHICH configuration by receiving the PBCH. On the other hand, the UE may implicitly know information on the number of transmission antenna ports of the eNB. The information on the number of the transmission antennas of the eNB is implicitly signaled by masking (e.g. XOR operation) a sequence corresponding to the number of the transmission antennas to 16-bit cyclic redundancy check (CRC) used in detecting an error of the PBCH.

The SIB1 includes not only information on time-domain scheduling for other SIBs but also parameters necessary to determine whether a specific cell is suitable in cell selection. The UE receives the SIB1 via broadcast signaling or dedicated signaling.

DL carrier frequency and a corresponding system bandwidth can be obtained by MIB carried by PBCH. A UL carrier frequency and a corresponding system bandwidth can be obtained through system information corresponding to a DL signal. Having received the MIB, if there is no valid system information stored in a corresponding cell, a UE applies a value of a DL BW included in the MIB to a UL bandwidth until system information block type 2 (SystemInformationBlockType2, SIB2) is received. For example, if the UE obtains the SIB2, the UE is able to identify the entire UL system bandwidth capable of being used for UL transmission through UL-carrier frequency and UL-bandwidth information included in the SIB2.

In the frequency domain, PSS/SSS and PBCH are transmitted irrespective of an actual system bandwidth in total 6 RBs, i.e., 3 RBs in the left side and 3 RBs in the right side with reference to a DC subcarrier within a corresponding OFDM symbol. In other words, the PSS/SSS and the PBCH are transmitted only in 72 subcarriers. Therefore, a UE is configured to detect or decode the SS and the PBCH irrespective of a downlink transmission bandwidth configured for the UE.

Having completed the initial cell search, the UE can perform a random access procedure to complete the accessing the eNB. To this end, the UE transmits a preamble via PRACH (physical random access channel) and can receive a response message via PDCCH and PDSCH in response to the preamble. In case of contention based random access, it may transmit additional PRACH and perform a contention resolution procedure such as PDCCH and PDSCH corresponding to the PDCCH.

Having performed the abovementioned procedure, the UE can perform PDCCH/PDSCH reception and PUSCH/PUCCH transmission as a general UL/DL signal transmission procedure.

The random access procedure is also referred to as a random access channel (RACH) procedure. The random access procedure is used for various usages including initial access, UL synchronization adjustment, resource allocation, handover, and the like. The random access procedure is categorized into a contention-based procedure and a dedicated (i.e., non-contention-based) procedure. In general, the contention-based random access procedure is used for performing initial access. On the other hand, the dedicated random access procedure is restrictively used for performing handover, and the like. When the contention-based random access procedure is performed, a UE randomly selects a RACH preamble sequence. Hence, a plurality of UEs can transmit the same RACH preamble sequence at the same time. As a result, a contention resolution procedure is required thereafter. On the contrary, when the dedicated random access procedure is performed, the UE uses an RACH preamble sequence dedicatedly allocated to the UE by an eNB. Hence, the UE can perform the random access procedure without a collision with a different UE.

The contention-based random access procedure includes 4 steps described in the following. Messages transmitted via the 4 steps can be respectively referred to as message (Msg) 1 to 4 in the present invention.

Step 1: RACH preamble (via PRACH) (UE to eNB)
Step 2: Random access response (RAR) (via PDCCH and PDSCH (eNB to)
Step 3: Layer 2/Layer 3 message (via PUSCH) (UE to eNB)
Step 4: Contention resolution message (eNB to UE)

On the other hand, the dedicated random access procedure includes 3 steps described in the following. Messages transmitted via the 3 steps can be respectively referred to as message (Msg) 0 to 2 in the present invention. It may also perform uplink transmission (i.e., step 3) corresponding to PAR as a part of the ransom access procedure. The dedicated random access procedure can be triggered using PDCCH (hereinafter, PDCCH order) which is used for an eNB to indicate transmission of an RACH preamble.

Step 0: RACH preamble assignment via dedicated signaling (eNB to UE)
Step 1: RACH preamble (via PRACH) (UE to eNB)
Step 2: Random access response (RAR) (via PDCCH and PDSCH) (eNB to UE)

After the RACH preamble is transmitted, the UE attempts to receive a random access response (RAR) in a preconfigured time window. Specifically, the UE attempts to detect PDCCH (hereinafter, RA-RNTI PDCCH) (e.g., a CRC masked with RA-RNTI in PDCCH) having RA-RNTI (random access RNTI) in a time window. If the RA-RNTI PDCCH is detected, the UE checks whether or not there is a RAR for the UE in PDSCH corresponding to the RA-RNTI PDCCH. The RAR includes timing advance (TA) information indicating timing offset information for UL synchronization, UL resource allocation information (UL grant information), a temporary UE identifier (e.g., temporary cell-RNTI, TC-RNTI), and the like. The UE can perform UL transmission (e.g., message 3) according to the resource allocation information and the TA value included in the RAR. HARQ is applied to UL transmission corresponding to the RAR. In particular, the UE can receive reception response information (e.g., PHICH) corresponding to the message 3 after the message 3 is transmitted.

A random access preamble (i.e. RACH preamble) consists of a cyclic prefix of a length of TCP and a sequence part of a length of TSEQ. The TCP and the TSEQ depend on a frame structure and a random access configuration. A preamble format is controlled by higher layer. The RACH preamble is transmitted in a UL subframe. Transmission of the random access preamble is restricted to a specific time resource and a frequency resource. The resources are referred to as PRACH resources. In order to match an index 0 with a PRB and a subframe of a lower number in a radio frame, the PRACH resources are numbered in an ascending order of PRBs in subframe numbers in the radio frame and frequency domain. Random access resources are defined according to a PRACH configuration index (refer to 3GPP TS 36.211 standard document). The RACH configuration index is provided by a higher layer signal (transmitted by an eNB).

In the LTE/LTE-A system, a subcarrier spacing for a random access preamble (i.e., RACH preamble) is regulated by 1.25 kHz and 7.5 kHz for preamble formats 0 to 3 and a preamble format 4, respectively (refer to 3GPP TS 36.211).

Figure 4:
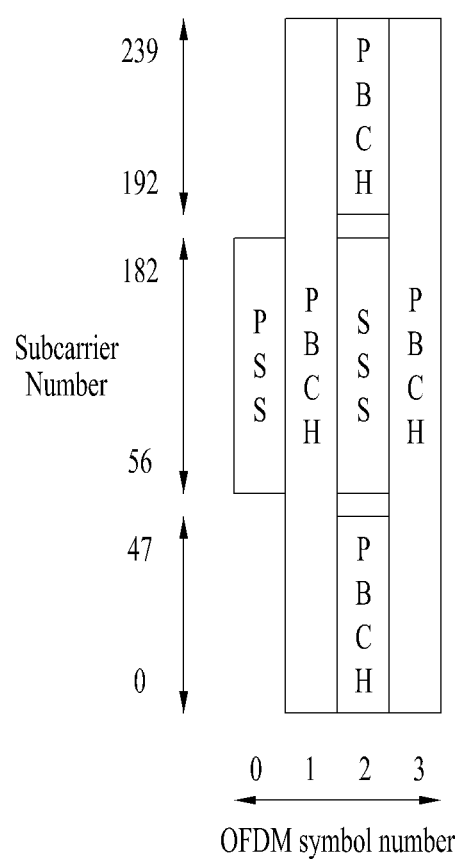
FIG. 4 is a view illustrating a structure of an SS/PBCH block used in an NR system.

FIG. 4 illustrates an SSB structure. The UE may perform cell search, system information acquisition, beam alignment for initial connection, DL measurement, etc. based on the SSB. The SSB is used interchangeably with the synchronization signal/physical broadcast channel (SS/PBCH) block.

Referring to FIG. 4, an SSB is composed of a PSS, a SSS and a PBCH. The SSB is composed of four consecutive OFDM symbols. The PSS, the PBCH, the SSS/PBCH and the PBCH are transmitted on each OFDM symbol, respectively. The PSS and the SSS are each composed of one OFDM symbol and 127 subcarriers, and the PBCH is composed of 3 OFDM symbols and 576 subcarriers. Polar coding and quadrature phase shift keying (QPSK) are applied to the PBCH. The PBCH is composed of a data RE and a demodulation reference signal (DMRS) RE for each OFDM symbol. There are three DMRS REs per RB, and there are three data REs between the DMRS REs.

The NR system uses an OFDM transmission scheme or a similar transmission system. The new RAT system may conform to OFDM parameters different from the OFDM parameters of LTE. Alternatively, the new RAT system may conform to the numerology of legacy LTE/LTE-A, but have a larger system bandwidth (e.g., 100 MHz). Alternatively, one cell may support a plurality of numerologies. That is, UEs operating with different numerologies may coexist within one cell.

Figure 5:
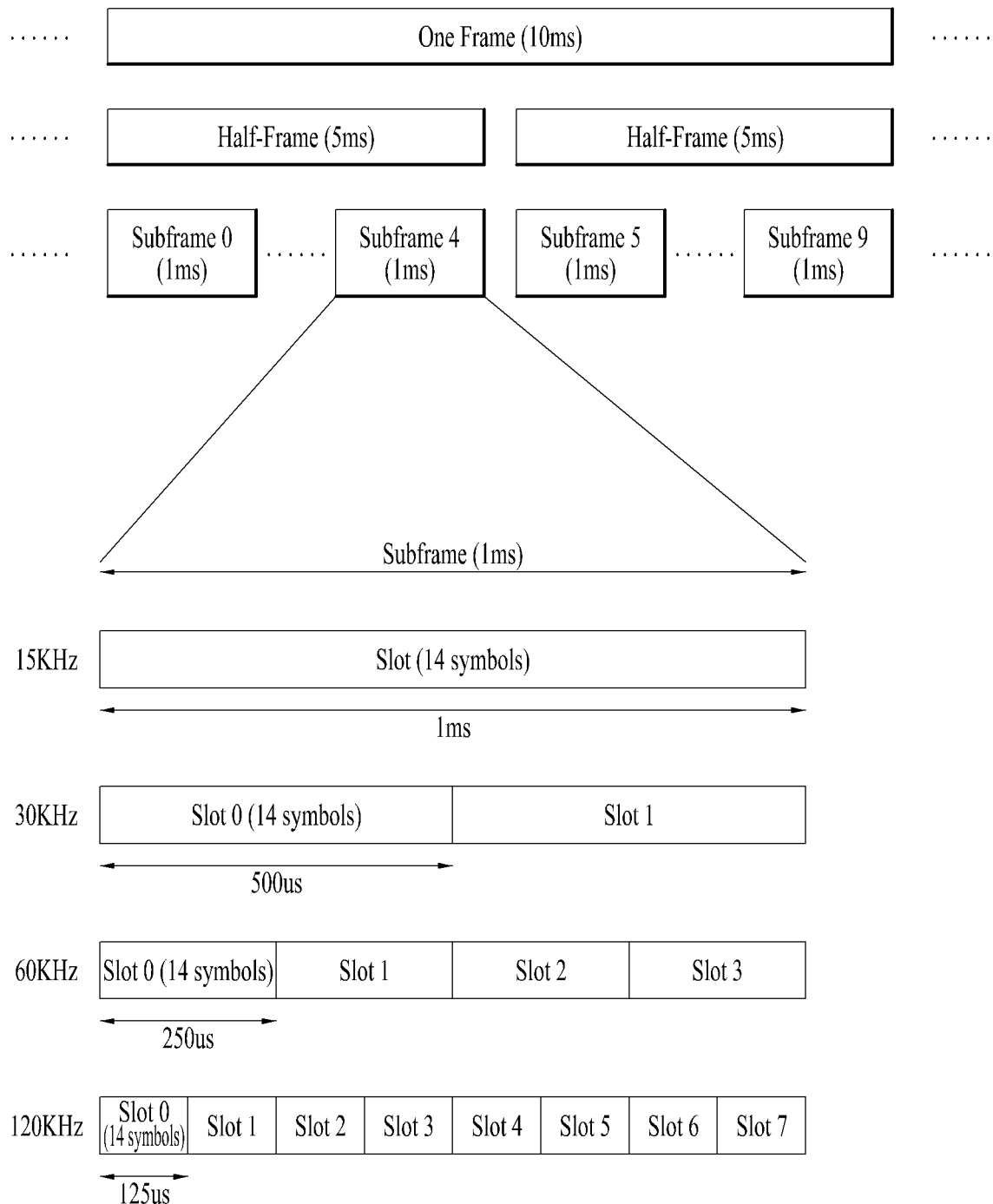
FIGS. 5 to 7 are views illustrating structures of a radio frame and slots used in the NR system.

FIG. 5 illustrates a structure of a radio frame used in NR.

In NR, UL and DL transmissions are configured in frames. The radio frame has a length of 10 ms and is defined as two 5 ms half-frames (HF). The half-frame is defined as five 1 ms subframes (SF). A subframe is divided into one or more slots, and the number of slots in a subframe depends on subcarrier spacing (SCS). Each slot includes 12 or 14 OFDM(A) symbols according to a cyclic prefix (CP). When a normal CP is used, each slot includes 14 symbols. When an extended CP is used, each slot includes 12 symbols. Here, the symbols may include OFDM symbols (or CP-OFDM symbols) and SC-FDMA symbols (or DFT-s-OFDM symbols).

Table 1 illustrates that the number of symbols per slot, the number of slots per frame, and the number of slots per subframe vary according to the SCS when the normal CP is used.

TABLE 1

| SCS (15*2^u) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

* $N^{slot}_{symb}$: Number of symbols in a slot
* $N^{frame,u}_{slot}$: Number of slots in a frame
* $N^{subframe,u}_{slot}$: Number of slots in a subframe Table 2 illustrates that the number of symbols per slot, the number of slots per frame, and the number of slots per subframe vary according to the SCS when the extended CP is used.

TABLE 2

| SCS (15*2^u) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In the NR system, the OFDM(A) numerology (e.g., SCS, CP length, etc.) may be configured differently among a plurality of cells merged for one UE. Thus, the (absolute time) duration of a time resource (e.g., SF, slot or TTI) (referred to as a time unit (TU) for simplicity) composed of the same number of symbols may be set differently among the merged cells.

Figure 6:
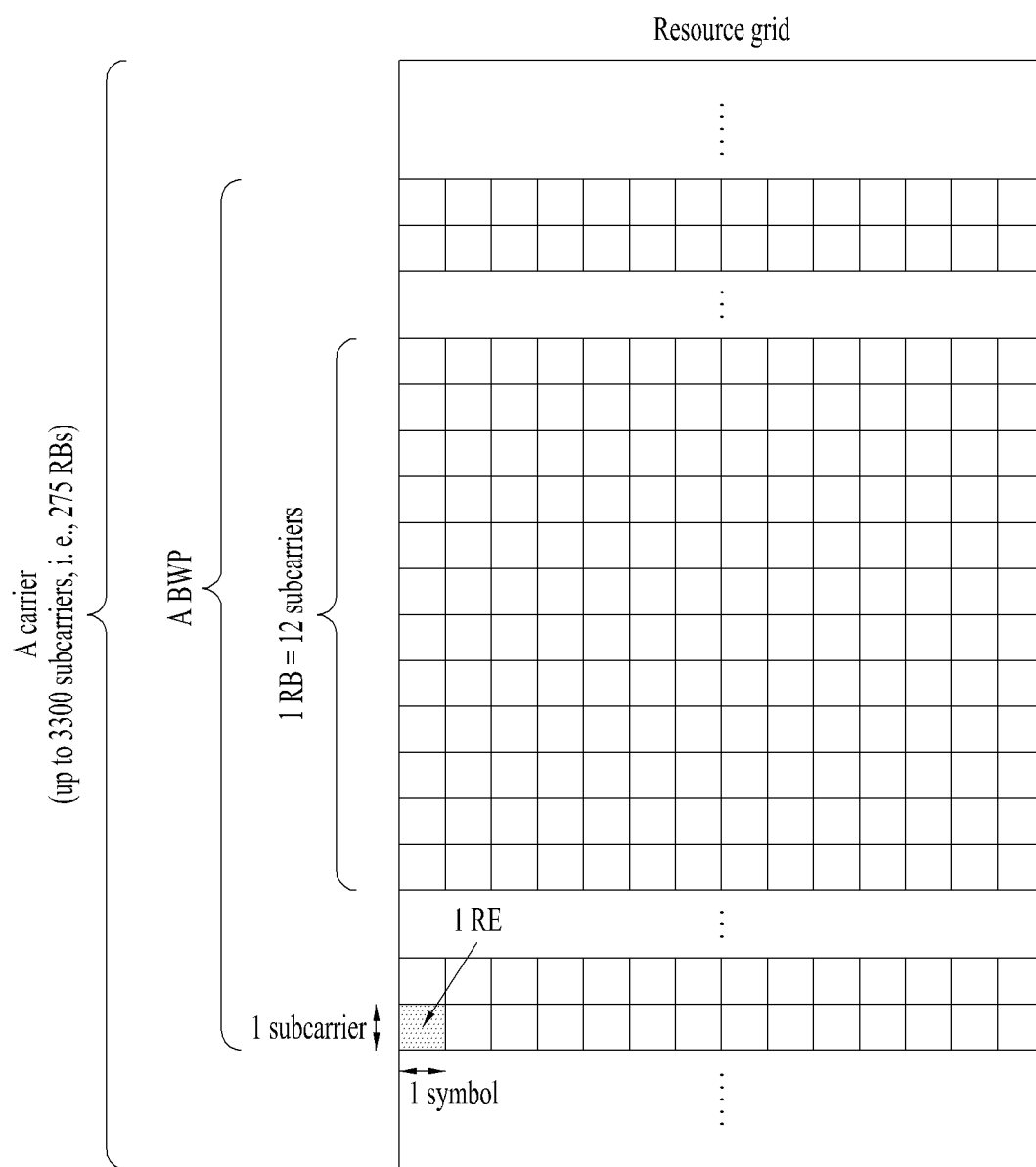

FIG. 6 illustrates a slot structure of an NR frame. A slot includes a plurality of symbols in the time domain. For example, in the case of the normal CP, one slot includes seven symbols. On the other hand, in the case of the extended CP, one slot includes six symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) is defined as a plurality of consecutive (P)RBs in the frequency domain and may correspond to one numerology (e.g., SCS, CP length, etc.). A carrier may include up to N (e.g., five) BWPs. Data communication is performed through an activated BWP, and only one BWP may be activated for one UE. In the resource grid, each element is referred to as a resource element (RE), and one complex symbol may be mapped thereto.

Figure 7:
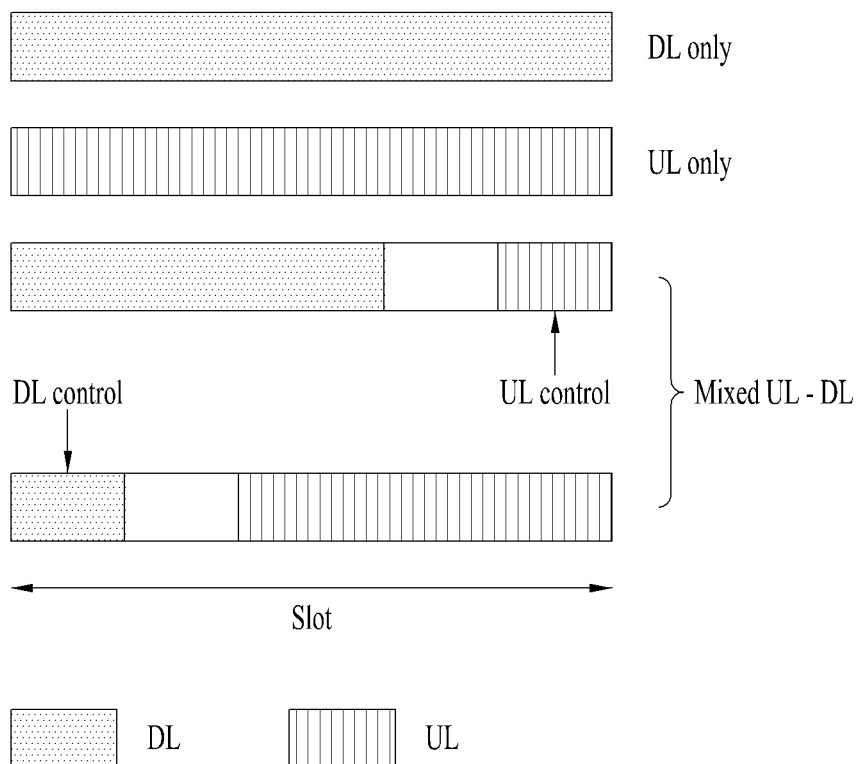

FIG. 7 illustrates a structure of a self-contained slot. In the NR system, a frame has a self-contained structure in which a DL control channel, DL or UL data, a UL control channel, and the like may all be contained in one slot. For example, the first N symbols (hereinafter, DL control region) in the slot may be used to transmit a DL control channel, and the last M symbols (hereinafter, UL control region) in the slot may be used to transmit a UL control channel. N and M are integers greater than or equal to 0. A resource region (hereinafter, a data region) that is between the DL control region and the UL control region may be used for DL data transmission or UL data transmission. For example, the following configuration may be considered. Respective sections are listed in a temporal order.

1. DL only configuration
2. UL only configuration
3. Mixed UL-DL configuration
   DL region+Guard period (GP)+UL control region
   DL control region+GP+UL region
   DL region: (i) DL data region, (ii) DL control region+DL data region
   UL region: (i) UL data region, (ii) UL data region+UL control region The PDCCH may be transmitted in the DL control region, and the PDSCH may be transmitted in the DL data region. The PUCCH may be transmitted in the UL control region, and the PUSCH may be transmitted in the UL data region. Downlink control information (DCI), for example, DL data scheduling information, UL data scheduling information, and the like, may be transmitted on the PDCCH. Uplink control information (UCI), for example, ACK/NACK information about DL data, channel state information (CSI), and a scheduling request (SR), may be transmitted on the PUCCH. The GP provides a time gap in the process of the UE switching from the transmission mode to the reception mode or from the reception mode to the transmission mode. Some symbols at the time of switching from DL to UL within a subframe may be configured as the GP.

For a 5G mobile communication system under discussion, a technique of using an ultra-high frequency band, that is, a millimeter frequency band at or above 6 GHz is considered in order to transmit data to a plurality of users at a high transmission rate in a wide frequency band. The 3GPP calls this technique NR, and thus a 5G mobile communication system will be referred to as an NR system in the present disclosure. However, the millimeter frequency band has the frequency property that a signal is attenuated too rapidly according to a distance due to the use of too high a frequency band. Accordingly, the NR system using a frequency band at or above at least 6 GHz employs a narrow beam transmission scheme in which a signal is transmitted with concentrated energy in a specific direction, not omni-directionally, to thereby compensate for the rapid propagation attenuation and thus overcome the decrease of coverage caused by the rapid propagation attenuation. However, if a service is provided by using only one narrow beam, the service coverage of one gNB becomes narrow, and thus the gNB provides a service in a wideband by collecting a plurality of narrow beams.

As a wavelength becomes short in the millimeter frequency band, that is, millimeter wave (mmW) band, it is possible to install a plurality of antenna elements in the same area. For example, a total of 100 antenna elements may be installed at (wavelength) intervals of 0.5 lamda in a 30-GHz band with a wavelength of about 1 cm in a two-dimensional (2D) array on a 5 by 5 cm panel. Therefore, it is considered to increase coverage or throughput by increasing a beamforming gain through use of a plurality of antenna elements in mmW.

To form a narrow beam in the millimeter frequency band, a beamforming scheme is mainly considered, in which a gNB or a UE transmits the same signals with appropriate phase differences through multiple antennas, to thereby increase energy only in a specific direction. Such beamforming schemes include digital beamforming for generating a phase difference between digital baseband signals, analog beamforming for generating a phase difference between modulated analog signals by using a time delay (i.e., a cyclic shift), and hybrid beamforming using both digital beamforming and analog beamforming. If a TXRU is provided per antenna element to enable control of transmission power and a phase per antenna, independent beamforming per frequency resource is possible. However, installation of TXRUs for all of about 100 antenna elements is not effective in terms of cost. That is, to compensate for rapid propagation attenuation in the millimeter frequency band, multiple antennas should be used, and digital beamforming requires as many RF components (e.g., digital to analog converters (DACs), mixers, power amplifiers, and linear amplifiers) as the number of antennas. Accordingly, implementation of digital beamforming in the millimeter frequency band faces the problem of increased cost of communication devices. Therefore, in the case where a large number of antennas are required as in the millimeter frequency band, analog beamforming or hybrid beamforming is considered. In analog beamforming, a plurality of antenna elements are mapped to one TXRU, and the direction of a beam is controlled by an analog phase shifter. A shortcoming with this analog beamforming scheme is that frequency selective beamforming (BF) cannot be provided because only one beam direction can be produced in a total band. Hybrid BF stands between digital BF and analog BF, in which B TXRUs fewer than Q antenna elements are used. In hybrid BF, the directions of beams transmittable at the same time is limited to or below B although the number of beam directions is different according to connections between B TXRUs and Q antenna elements.

Digital BF performs signal processing on a digital baseband signal that is to be transmitted or is received as mentioned above, and therefore it may transmit or receive signals in multiple directions at the same time using multiple beams. In contrast, analog BF performs beamforming with an received analog signal or an analog signal to be transmitted in a modulated state, and therefore it cannot simultaneously transmit or receive signals in multiple directions beyond the range covered by one beam. In general, a gNB communicates with multiple users at the same time using broadband transmission or multi-antenna characteristics. When the gNB uses analog or hybrid BF and forms an analog beam in one beam direction, the gNB is allowed to communicate only with users included in the same analog beam direction due to the characteristics of analog BF. A RACH resource allocation scheme and a scheme of resource utilization in the gNB according to the present invention to be described later are proposed in consideration of constraints resulting from the characteristics of analog BF or hybrid BF.

Figure 8:
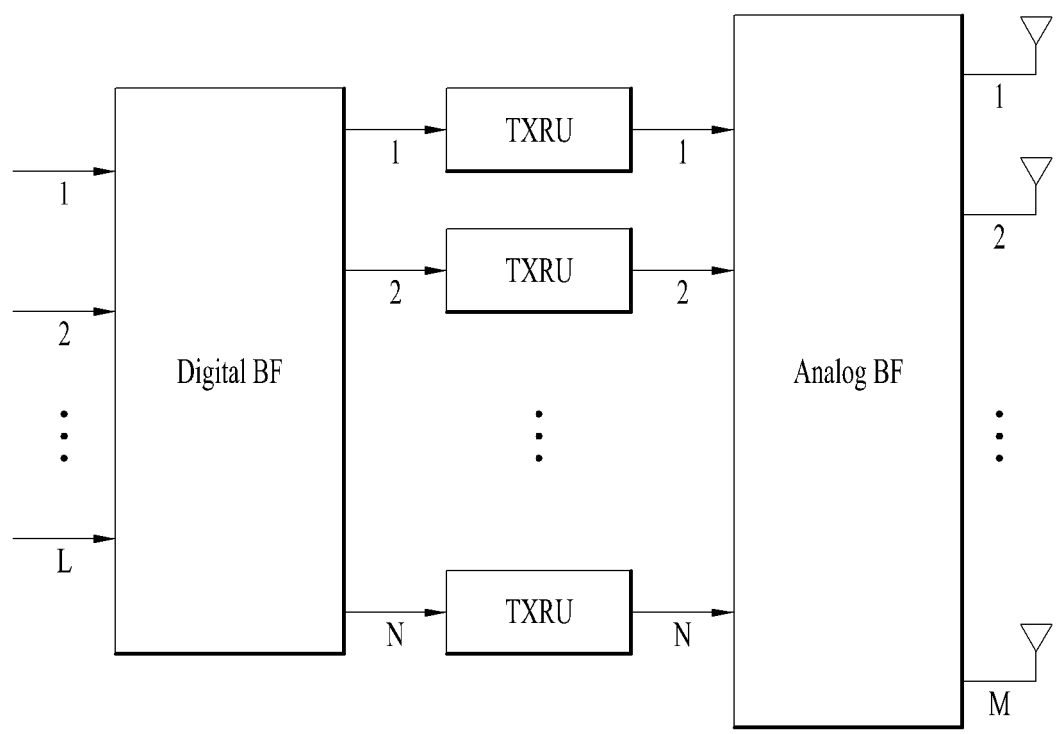
FIG. 8 is a view illustrating exemplary connection schemes between transceiver units (TXRUs) and antenna elements.

FIG. 8 abstractly illustrates a hybrid beamforming structure in terms of TXRUs and physical antennas.

For the case where multiple antennas are used, hybrid BF with digital BF and analog BF in combination has emerged. Analog BF (or RF BF) is an operation of performing precoding (or combining) in an RF unit. Due to precoding (combining) in each of a baseband unit and an RF unit, hybrid BF offers the benefit of performance close to the performance of digital BF, while reducing the number of RF chains and the number of DACs (or analog to digital converters (ADCs). For the convenience' sake, a hybrid BF structure may be represented by N TXRUs and M physical antennas. Digital BF for L data layers to be transmitted by a transmission end may be represented as an N-by-N matrix, and then N converted digital signals are converted to analog signals through TXRUs and subjected to analog BF represented as an M-by-N matrix. In FIG. 8, the number of digital beams is L, and the number of analog beams is N. Further, it is considered in the NR system that a gNB is configured to change analog BF on a symbol basis so as to more efficiently support BF for a UE located in a specific area. Further, when one antenna panel is defined by N TXRUs and M RF antennas, introduction of a plurality of antenna panels to which independent hybrid BF is applicable is also considered. As such, in the case where a gNB uses a plurality of analog beams, a different analog beam may be preferred for signal reception at each UE. Therefore, a beam sweeping operation is under consideration, in which for at least an SS, system information, and paging, a gNB changes a plurality of analog beams on a symbol basis in a specific slot or SF to allow all UEs to have reception opportunities.

Figure 9:
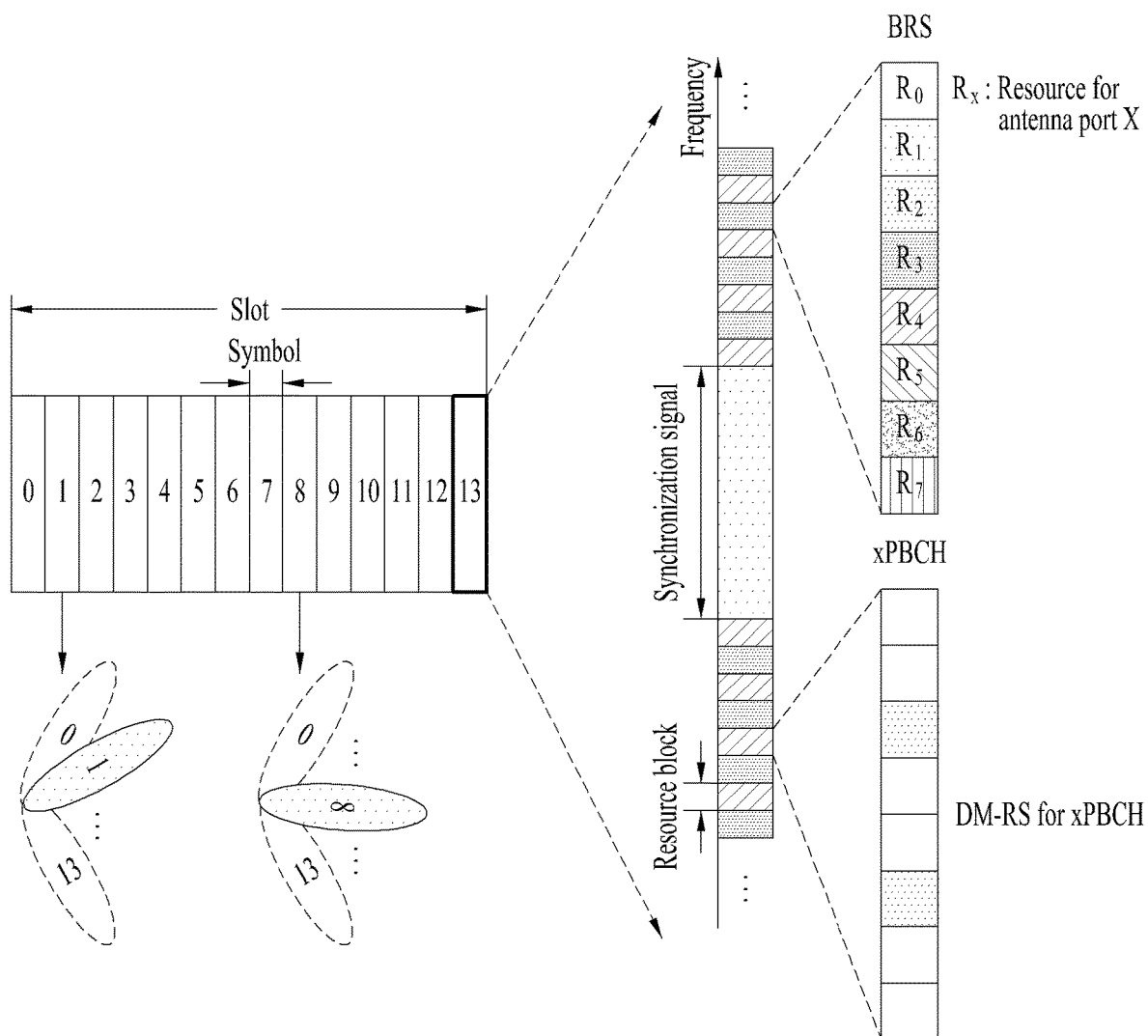
FIG. 9 is a view illustrating beam sweeping for a synchronization signal and system information during downlink (DL) transmission.

FIG. 9 is a view illustrating beam sweeping for an SS and system information during DL transmission. In FIG. 9, physical resources or a physical channel which broadcasts system information of the New RAT system is referred to as an xPBCH. Analog beams from different antenna panels may be transmitted simultaneously in one symbol, and introduction of a beam reference signal (BRS) transmitted for a single analog beam corresponding to a specific antenna panel as illustrated in FIG. 9 is under discussion in order to measure a channel per analog beam. BRSs may be defined for a plurality of antenna ports, and each antenna port of the BRSs may correspond to a single analog beam. Unlike the BRSs, the SS or the xPBCH may be transmitted for all analog beams included in an analog beam group so that any UE may receive the SS or the xPBCH successfully.

Figure 10:
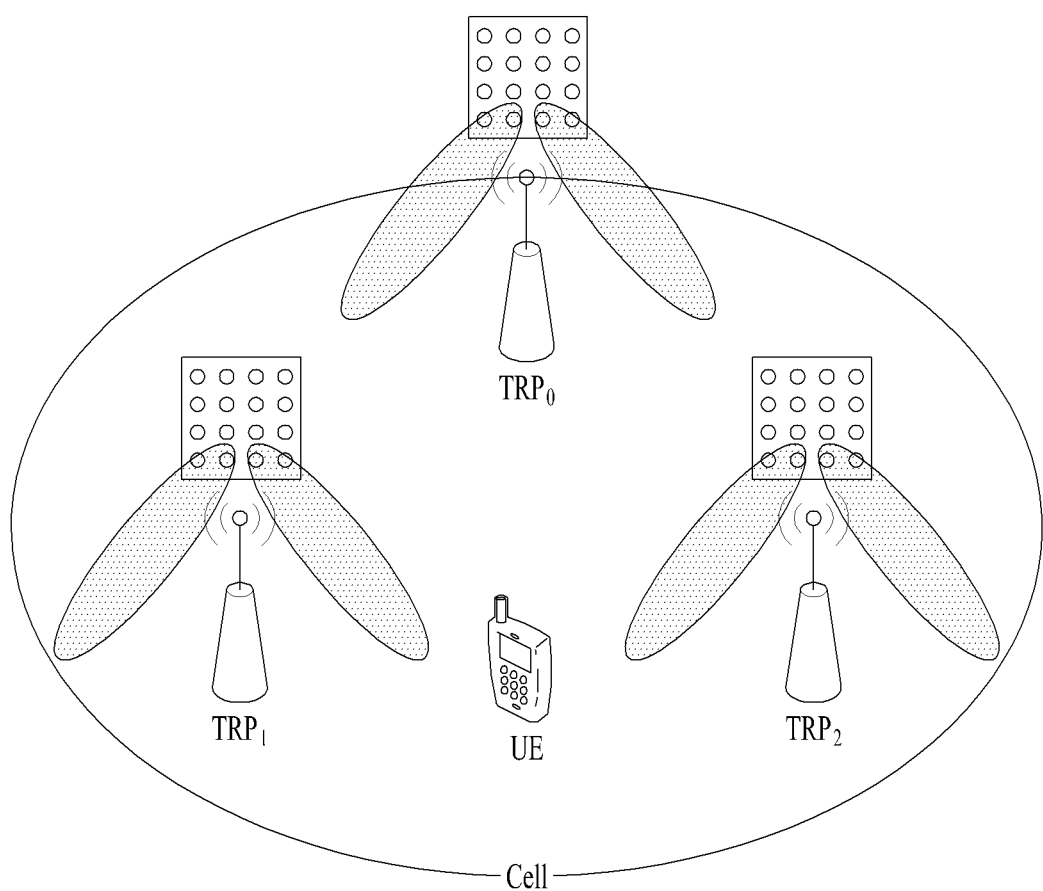
FIG. 10 is a view illustrating an exemplary cell in an NR system.

FIG. 10 is a view illustrating an exemplary cell in the NR system.

Referring to FIG. 10, compared to a wireless communication system such as legacy LTE in which one eNB forms one cell, configuration of one cell by a plurality of TRPs is under discussion in the NR system. If a plurality of TRPs form one cell, even though a TRP serving a UE is changed, seamless communication is advantageously possible, thereby facilitating mobility management for UEs.

Compared to the LTE/LTE-A system in which a PSS/SSS is transmitted omni-directionally, a method for transmitting a signal such as a PSS/SSS/PBCH through BF performed by sequentially switching a beam direction to all directions at a gNB applying mmWave is considered. The signal transmission/reception performed by switching a beam direction is referred to as beam sweeping or beam scanning. In the present disclosure, "beam sweeping" is a behavior of a transmission side, and "beam scanning" is a behavior of a reception side. For example, if up to N beam directions are available to the gNB, the gNB transmits a signal such as a PSS/SSS/PBCH in the N beam directions. That is, the gNB transmits an SS such as the PSS/SSS/PBCH in each direction by sweeping a beam in directions available to or supported by the gNB. Or if the gNB is capable of forming N beams, the beams may be grouped, and the PSS/SSS/PBCH may be transmitted/received on a group basis. One beam group includes one or more beams. Signals such as the PSS/SSS/PBCH transmitted in the same direction may be defined as one SS block (SSB), and a plurality of SSBs may exist in one cell. If a plurality of SSBs exist, an SSB index may be used to identify each SSB. For example, if the PSS/SSS/PBCH is transmitted in 10 beam directions in one system, the PSS/SSS/PBCH transmitted in the same direction may form an SSB, and it may be understood that 10 SSBs exist in the system. In the present disclosure, a beam index may be interpreted as an SSB index.

Hereinafter, a method for transmitting and receiving system information and a method for configuring a monitoring window for receiving the system information according to the present invention will be described.

In the present invention, properties of a system information (SI) PDCCH monitoring window will be defined for the New RAT (NR) system to know the position of the SI control resource set (CORESET) in the time domain, and a method for configuring the CORESET according to the properties of the SI PDCCH monitoring window will be described.

In the current NR, the SS/PBCH blocks are all positioned within a 5 ms window regardless of the periodicity of the SS/PBCH blocks. That is, the SS/PBCH blocks are all positioned within a 5 ms half-frame having a length which is half the length of a 10 ms frame.

In this case, the SS/PBCH block may include an NR-PBCH, and the UE may obtain information related to the CORESET of the remaining minimum system information (RMSI) using the information included in the payload of the NR-PBCH. The RMSI is system information obtained based on a master information block (MIB) obtained through the PBCH, and may be referred to as system information block 1 (SIB1).

There is an RMSI CORESET corresponding to each SS/PBCH block. That is, there is an RMSI CORESET for each SS/PBCH block. Therefore, when there is an SS/PBCH block for each beam, an RMSI CORESET is also defined for each beam. The information related to the CORESET of the RMSI includes a bandwidth, the number of OFDM symbols, the frequency domain position, and the time domain position of the CORESET. Here, the CORESET is a region including monitoring occasions on which the UE may monitor PDCCH candidates. That is, it refers to a region including one or more search spaces or search space sets for monitoring the PDCCH.

The information related to the RMSI CORESET may be transmitted through the payload of the NR-PBCH. The NR-PBCH payload is composed of 56 bits in total, of which 8 bits may be used for the RMSI CORESET configuration.

For the flexibility of the gNB, it may be better to establish RMSI CORESET configuration as variously as possible. However, the flexibility of the gNB is limited due to the limit of usable bits.

Therefore, in order to recognize the position of the RMSI CORESET in the time domain, it may be efficient to define properties related to the RMSI PDCCH monitoring window and to transmit the RMSI CORESET within the defined monitoring window. In the present invention, properties of the RMSI PDCCH monitoring window will be defined first and then a method for configuring an RMSI CORESET according to the properties of the RMSI PDCCH monitoring window will be described.

Before description of the properties of the RMSI PDCCH monitoring window and a method for configuring an RMSI CORESET according to the properties, a procedure of transmitting and receiving RMSI based on the RMSI CORESET configured according to the embodiment of the present invention will be described.

Figure 11:
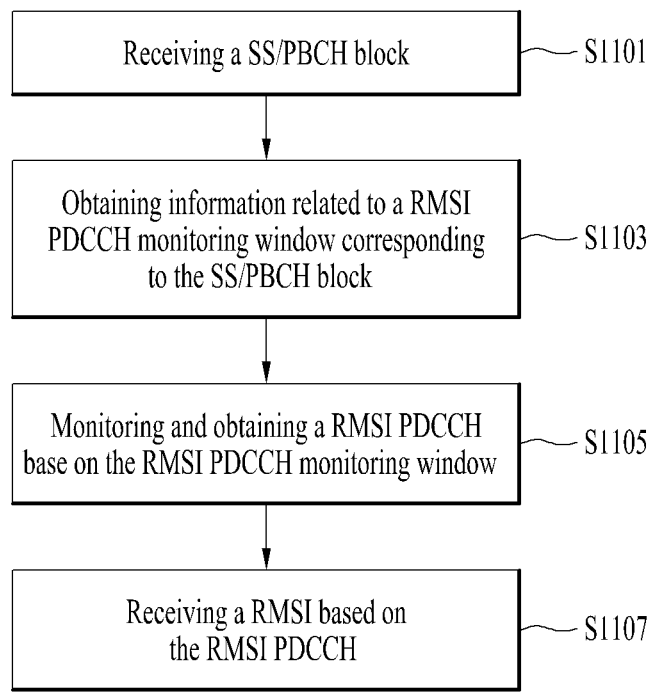
FIGS. 11 to 13 are views illustrating a procedure for receiving remaining minimum system information (RMSI) according to an embodiment of the present invention.

FIG. 11 is a view illustrating a method for receiving RMSI by a UE according to an embodiment of the present invention. Referring to FIG. 11, the UE receives one or more SS/PBCH blocks within a 5 ms window (S1101). The UE may obtain RMSI CORESET configuration information through the PBCH payload, i.e., the master information block (MIB), included in the received SS/PBCH block. Here, the RMSI CORESET configuration information includes information related to an RMSI PDCCH monitoring window for receiving an RMSI PDCCH corresponding to the received SS/PBCH (S1103).

The UE may recognize at least one of a period and a duration of the RMSI PDCCH monitoring window, a corresponding SS/PBCH block, and an offset of the RMSI PDCCH monitoring window through the information related to the RMSI PDCCH monitoring window obtained in operation S1103. The period and duration of the RMSI PDCCH monitoring window, the corresponding SS/PBCH block, and the offset of the RMSI PDCCH monitoring window may conform to a method for RMSI PDCCH monitoring configuration of the present invention which will be described later.

Thereafter, the UE monitors the RMSI PDCCH of the corresponding SS/PBCH block within the RMSI PDCCH monitoring window and receives the RMSI PDCCH (S1105). The UE receives RMSI through the PDSCH scheduled by the RMSI PDCCH (S1107).

Hereinafter, an RMSI transmission operation from a gNB perspective according to an embodiment of the present invention will be described with reference to FIG. 12.

Figure 12:
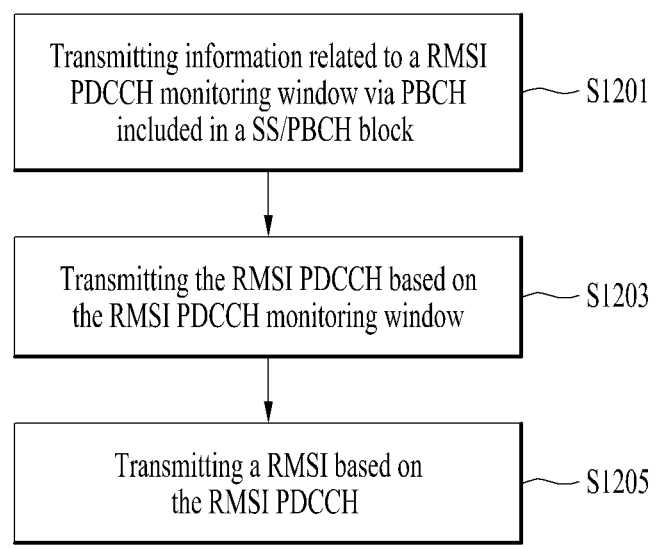

Referring to FIG. 12, the gNB places RMSI CORESET configuration information in the PBCH payload, that is, the MIB. The RMSI CORESET configuration information includes RMSI PDCCH monitoring window-related information including at least one of a period and a duration of the RMSI PDCCH monitoring window, a corresponding SS/PBCH block, and an offset of the RMSI PDCCH monitoring window. Thereafter, the gNB transmits one or more SS/PBCH blocks including a PBCH to the UE within the 5 ms window (S1201). Here, the period and duration of the RMSI PDCCH monitoring window, the corresponding SS/PBCH block, and the offset of the RMSI PDCCH monitoring window may conform to a method for RMSI PDCCH monitoring configuration of the present invention which will be described later.

Then, the gNB transmits an RMSI PDCCH corresponding to the SS/PBCH block in the RMSI PDCCH monitoring window (S1203), and transmits the RMSI through the PDSCH scheduled by the RMSI PDCCH (S1205).

Hereinafter, operations of the UE and the gNB illustrated in FIGS. 11 and 12 will be described from a network perspective with reference to FIG. 13.

Figure 13:
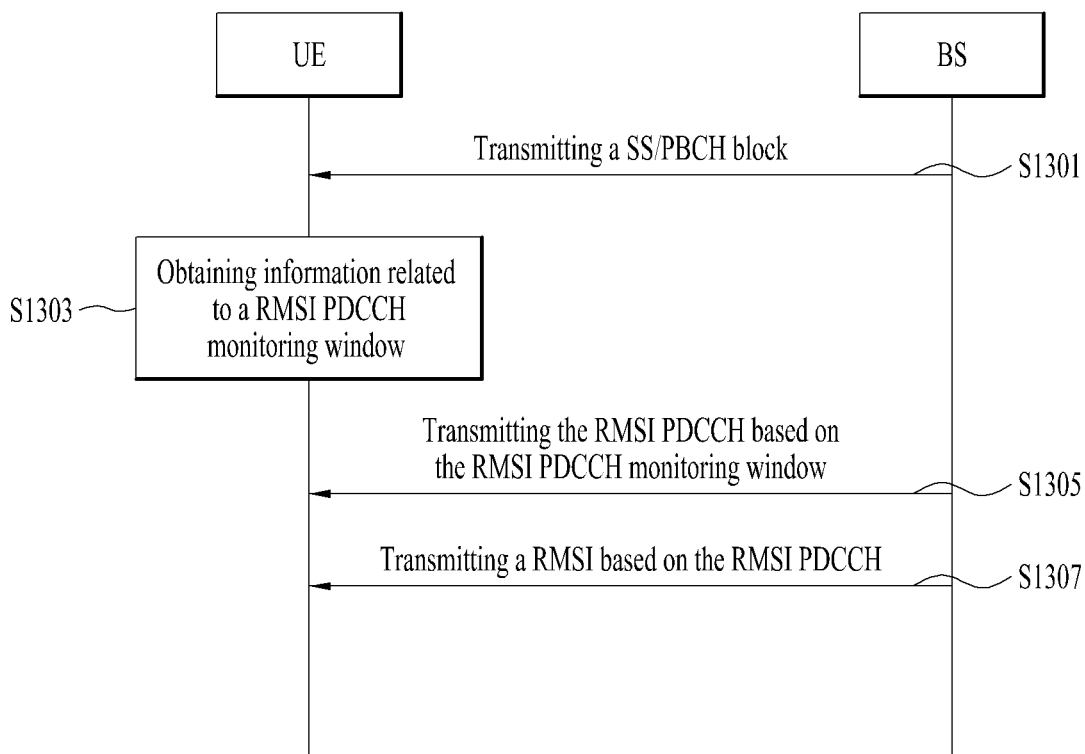

Referring to FIG. 13, the gNB places RMSI CORESET configuration information in the PBCH payload, that is, the MIB. The RMSI CORESET configuration information includes RMSI PDCCH monitoring window-related information including at least one of a period and a duration of the RMSI PDCCH monitoring window, a corresponding SS/PBCH block, and an offset of the RMSI PDCCH monitoring window. Thereafter, the gNB transmits one or more SS/PBCH blocks including a PBCH to the UE within the 5 ms window (S1301). The UE receiving the SS/PBCH block obtains at least one of the period and duration of the RMSI PDCCH monitoring window, the corresponding SS/PBCH block, and the offset of the RMSI PDCCH monitoring window through the PBCH payload, that is, the MIB (S1303), and receives the RMSI PDCCH transmitted from the gNB in the RMSI PDCCH monitoring window (S1305). Thereafter, the gNB transmits the RMSI through the PDSCH scheduled by the RMSI PDCCH, and the UE receives the PDSCH including the RMSI based on scheduling of the RMSI PDCCH (S1307).

<Monitoring Window Configuration for RMSI CORESET>

Figure 14:
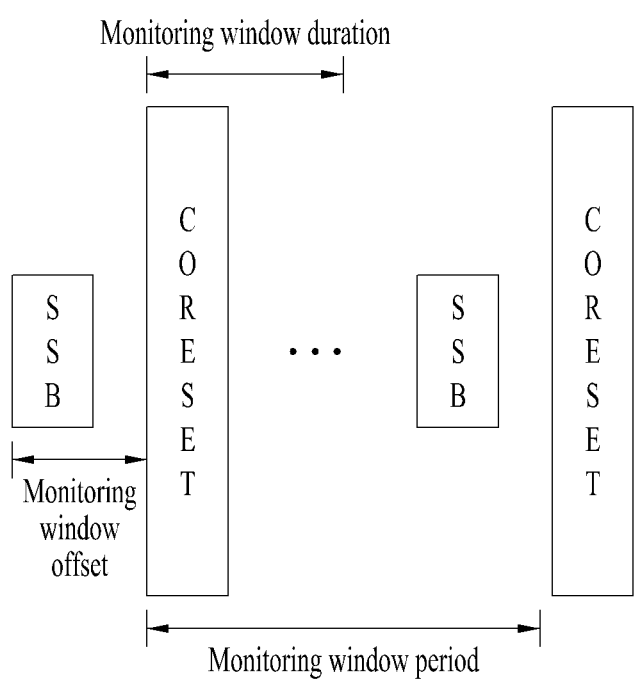
FIG. 14 is a view illustrating an RMSI control resource set (CORESET).

In the present invention, the properties of the RMSI PDCCH monitoring window are divided into a monitoring window offset, a monitoring window duration, and a monitoring window period. Referring to FIG. 14, among the properties, the monitoring window offset indicates an interval between the start timing of the SS/PBCH block transmission and the start timing of the RMSI CORESET monitoring. The monitoring window duration indicates the length of a monitoring window corresponding to one SS/PBCH block. The monitoring window period indicates the time from the end of one monitoring window to the start of the next monitoring.

Embodiments for monitoring window configuration methods according to the definition of the monitoring window offset, the monitoring window duration, and the monitoring window period are disclosed below.

Embodiment 1-1

Figure 15:
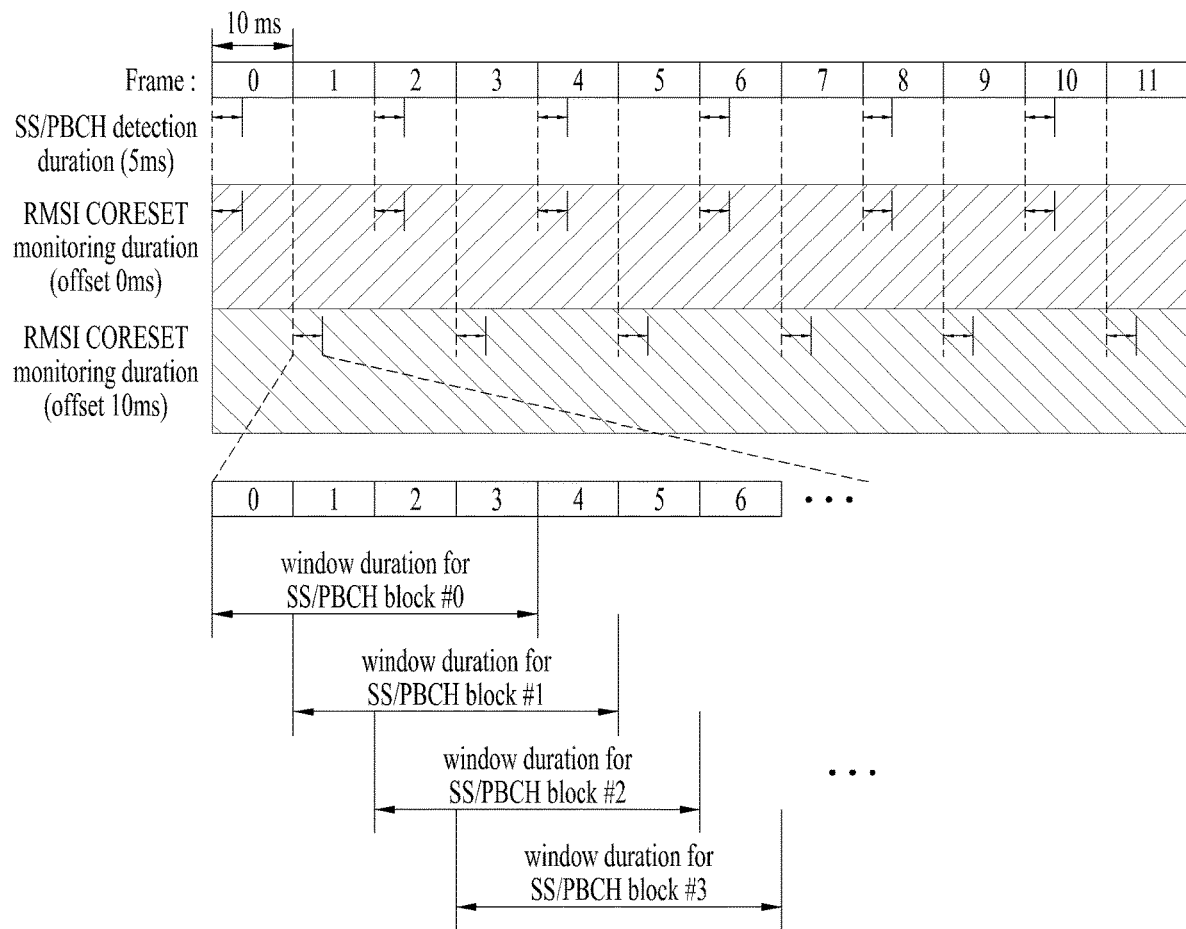

The properties of the monitoring window of Embodiment 1-1 may be configured as shown in FIG. 15. Specifically, since the default transmission period of the SS/PBCH block is 20 ms, the monitoring window period may be set to 20 ms so as to coincide with the default transmission period of the SS/PBCH block.

If the SS/PBCH block is transmitted in an interval from 0 ms to 5 ms, and the RMSI CORESET is transmitted in an interval from 5 ms and 10 ms, slots that may be used for uplink may be insufficient within the interval from 0 ms to 10 ms. Therefore, the monitoring window offset may be selected from 0 ms or 10 ms considering the balance between the downlink and the uplink. In addition, the monitoring duration may be selected from 1/2/4 slots and configured considering the flexibility of the network.

In the present embodiment, the monitoring windows of the SS/PBCH blocks corresponding to the respective beams may be configured to overlap each other such that the entirety of the monitoring slots of the RMSI CORESET is not too long.

For example, in FIG. 15, when the monitoring window of a SS/PBCH block with index #0 is set to slots 0 to 3, the monitoring window of a SS/PBCH block with index #1 may start so as to differ from the monitoring window of the SS/PBCH block with index #0 by one slot and be set to slots #1 to #4. That is, the monitoring window of the SS/PBCH block with index #0 and the monitoring window of the SS/PBCH block with index #1 may be configured to overlap each other over three slots from slot 2 to slot 4. FIG. 15 illustrates a case where the duration of the monitoring window is set to four slots. The duration of the monitoring window for each SS/PBCH block may be set to two slots. In this case, the monitoring windows may be configured to overlap each other over one slot or two slots. For example, when the monitoring window of the SS/PBCH block with index #0 is set to slots 0 and 1, the monitoring window of the SS/PBCH block with index #1 may be set to slots 1 to 2, and thus the monitoring windows may be configured to overlap over one slot. In another case, when the monitoring window of the SS/PBCH block with index #0 is set to slots 0 and 1, the monitoring window of the SS/PBCH block with index #1 may also be set to slots 0 to 1. Details of this case will be described later in Embodiments 2-1 and 2-2.

Embodiment 1-2

Figure 16:
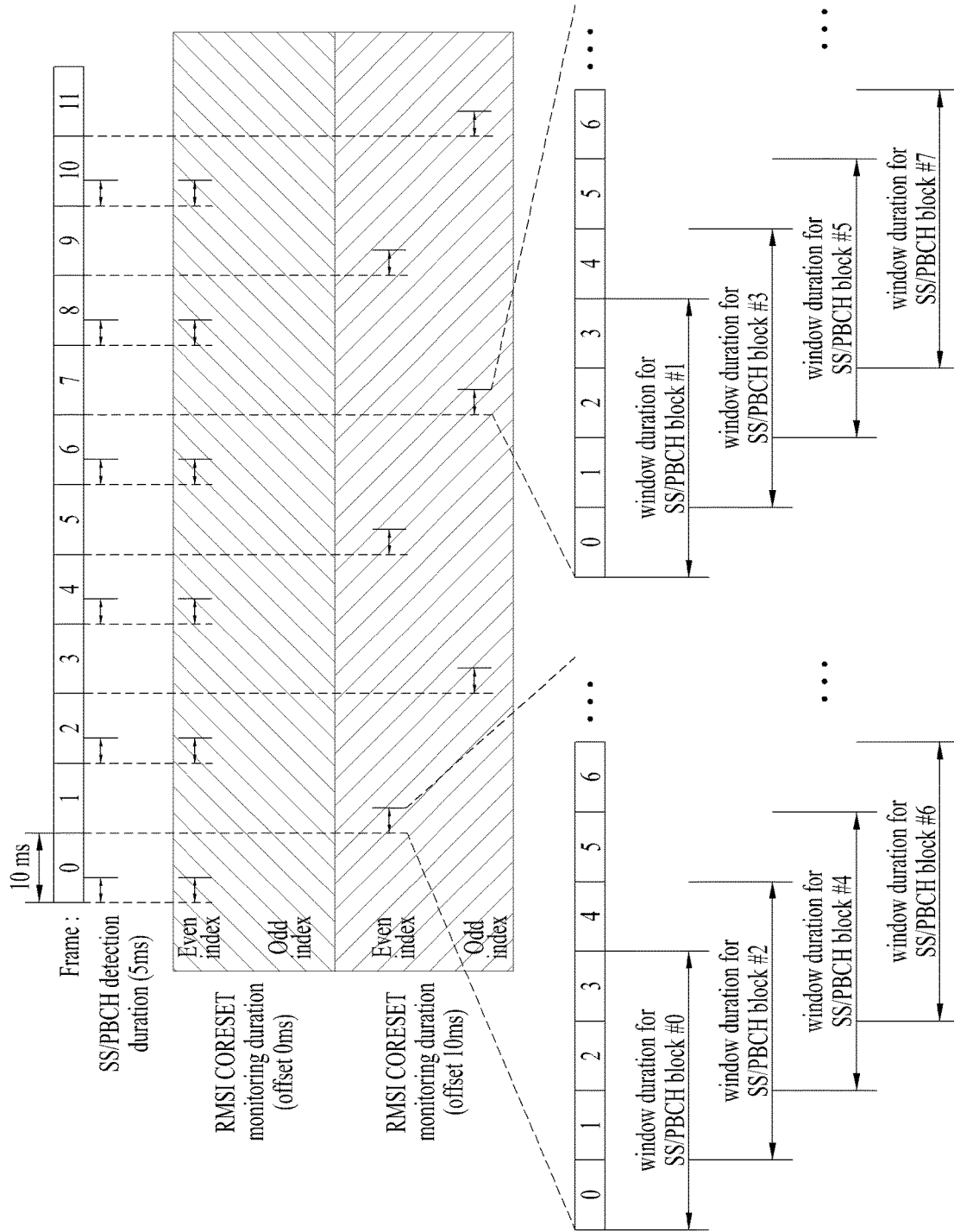

The properties of a monitoring window of Embodiment 1-2 may be configured as shown in FIG. 16. Specifically, since the default transmission period of the SS/PBCH block is 20 ms, the monitoring window period may be set to 20 ms so as to coincide with the default transmission period of the SS/PBCH block.

However, transmitting the RMSI CORESETs of all beams every 20 ms may cause excessive overhead on the side of the system. Thus, a beam with an odd index and a beam with an even index may be alternately transmitted every 20 ms. Thereby, the overhead of the system may be reduced by half.

When the SS/PBCH block is transmitted in an interval from 0 ms to 5 ms and the RMSI CORESET is transmitted in an interval 5 ms to 10 ms, slots that may be used for uplink may be insufficient within the interval from 0 ms to 10 ms. Therefore, the monitoring window offset may be selected from 0 ms or 10 ms considering the balance between the downlink and the uplink. In addition, the monitoring duration may be selected from 1/2/4 slots and configured considering the flexibility of the network.

In the present embodiment, the monitoring windows of the SS/PBCH blocks corresponding to the respective beams may be configured to overlap each other such that the entirety of the monitoring slots of the RMSI CORESET is not too long.

For example, in FIG. 16, when the monitoring window of a SS/PBCH block with index #0 is set to slots 0 to 3, the monitoring window of a SS/PBCH block with index #2 may start so as to differ from the monitoring window of the SS/PBCH block with index #0 by one slot and thus be set to slots 1 to 4. That is, the monitoring window of the SS/PBCH block with index #0 and the monitoring window of the SS/PBCH block with index #2 may be configured to overlap each other over three slots from slots 2 to 4. FIG. 16 shows a case where the duration of the monitoring window is set to four slots. The duration of the monitoring window for each SS/PBCH block may be set to two slots. In this case, the monitoring windows may be configured to overlap each other over one slot or two slots. For example, when the monitoring window of the SS/PBCH block with index #0 is set to slots 0 and 1, the monitoring window of the SS/PBCH block with index #2 is set to slots 1 to 2, and thus the monitoring windows may be configured to overlap over one slot. In another case, when the monitoring window of the SS/PBCH block with index #0 is set to slots 0 and 1, the monitoring window of the SS/PBCH block with index #2 may also be set to slots 0 to 1. Details of this case will be described later in Embodiments 2-1 and 2-2.

<RMSI CORESET Composition in Monitoring Window>

In NR, the number of OFDM symbols of the RMSI CORESET for each beam is configured using the PBCH payload, that is, the MIB. In the present invention, the number of OFDM symbols of the RMSI CORESET for each beam is presented in Table 3, and the RMSI CORESET composition in slots according to the number of OFDM symbols will be described. The number of OFDM symbols of the RMSI CORESET for each beam may be configured according to Table 3 below.

TABLE 3

| Code word | # of OFDM symbol |
|---|---|
| 00 | 1 (only one CORESET per beam can compose within a slot) |
| 01 | 1 (up to two CORESET per beam can compose within a slot) |
| 10 | 2 |
| 11 | 3 |

Up to three PDCCH OFDM symbols may be present in one slot. Therefore, when the number of OFDM symbols of an RMSI CORESET is 2 or 3, the symbols on which two or more RMSI CORESETs are to be positioned are insufficient in one slot, and therefore an RMSI CORESET for each beam is present per slot. When the number of OFDM symbols of the RMSI CORESET is 1, up to 3 RMSI CORESETs of multiple beams may be present in one slot.

However, when three RMSI CORESETs for the respective beams are arranged in one slot, the number of beam sweeping operations in the slot may increase, resulting in inefficient operation of the UE. Therefore, in the present invention, Table 3 has been created by limiting the maximum number of RMSI CORESETs for respective beams that may be arranged in one slot to 2. Therefore, in Embodiments 2-1 and 2-2 described below, a case where one RMSI CORESET for each beam is arranged in one slot and a case where two RMSI CORESETs for each beam are arranged in one slot will be described respectively.

Embodiment 2-1: A Case where an RMSI CORESET (RMSI CORESET for Each Beam) Corresponding to One SS/PBCH Block is Arranged in One Slot Embodiment 2-1 corresponds to a case of code words '00', '10', and '11' in Table 3.

An RMSI CORESET corresponding to an SS/PBCH block is arranged in a monitoring window duration. Embodiment 2-1 will be described based on Embodiment 1-1 and Embodiment 1-2 with reference to (a) and (b) of FIG. 17.

FIG. 17(a) is a view illustrating the case of Embodiment 2-1 for Embodiment 1-1, and FIG. 17(b) is a view illustrating the case of Embodiment 2-1 for Embodiment 1-2. Referring to FIGS. 17(a) and 17(b), since one RMSI CORESET is arranged in one slot, one monitoring window corresponding to one SS/PBCH block may overlap a monitoring window corresponding to another SS/PBCH block but may not be exactly the same as the other monitoring window.

For example, in FIG. 17(a), the monitoring window of the SS/PBCH block with index #0 may overlap the monitoring window of the SS/PBCH block with index #1 over three slots but may not completely overlap the other monitoring window. That is, the starting point of the monitoring window of the SS/PBCH block with index #1 may differ from the starting point of the monitoring window of the SS/PBCH block with index #0 by one slot.

While FIG. 17(a) illustrates an embodiment for a case where the monitoring window duration is composed of four slots, the monitoring window duration may be composed of two slots. That is, when the monitoring window of the SS/PBCH block with index #0 is composed of slots 0 and 1, the monitoring window of the SS/PBCH block with index #1 may be composed of slots 1 and 2, and thus the monitoring windows may overlap over one slot.

Embodiment 2-2: A Case where Two RMSI CORESETs (RMSI CORESETs for Each Beam) Corresponding to Two SS/PBCH Blocks are Arranged in One Slot Embodiment 2-2 corresponds to a case of code word '01' in Table 3.

An RMSI CORESET corresponding to an SS/PBCH block is arranged in a monitoring window duration. Embodiment 2-2 will be described based on Embodiment 1-1 and Embodiment 1-2 with reference to (a) and (b) of FIG. 18.

FIG. 18(a) is a view illustrating the case of Embodiment 2-2 for Embodiment 1-1, and FIG. 18(b) is a view illustrating the case of Embodiment 2-2 for Embodiment 1-2.

Referring to FIGS. 18(a) and 18(b), since two RMSI CORESETs are arranged in one slot, one monitoring window corresponding to one SS/PBCH block may share the monitoring window with a monitoring window corresponding to another SS/PBCH block.

For example, in FIG. 18 (a), the monitoring window of the SS/PBCH block with index #0 and the monitoring window of the SS/PBCH block with index #1 are composed of slots 0 to 3 and therefore completely overlap each other. However, when the monitoring windows of the SS/PBCH blocks with indexes #0 and #1 are defined as slots 0 to 3, the monitoring windows of the SS/PBCH blocks with indexes #0 and #1 cannot be shared with the monitoring windows of the SS/PBCH blocks with indexes #2 and #3 because two RMSI CORESETs are arranged in one slot. That is, they cannot completely overlap each other.

In this case, similar to Embodiment 2-1, the monitoring windows of the SS/PBCH blocks with indexes #2 and #3 are allowed to partially overlap the monitoring windows of the SS/PBCH blocks with indexes #0 and #1.

For example, when the monitoring windows of the SS/PBCH blocks with indexes #0 and #1 are defined as slots 0 to 3, the monitoring windows of the SS/PBCH blocks with indexes #2 and #3 may be defined as slots 1 to 4, and thus the monitoring windows of the SS/PBCH blocks with indexes #0 and #1 may overlap the monitoring windows of the SS/PBCH blocks with indexes #2 and #3 in slots 1 to 3. That is, there may be a difference of one slot between the starting point of the monitoring windows of the SS/PBCH blocks with indexes #0 and #1 and the starting point of the monitoring windows of the SS/PBCH blocks with indexes #2 and #3.

While FIG. 18 (a) illustrates an embodiment for a case where the monitoring window duration is composed of four slots, the monitoring window duration may be composed of two slots. That is, the monitoring windows of the SS/PBCH blocks with indexes #0 and #1 may be composed of slots 0 and 1, and thus the monitoring windows of the SS/PBCH blocks with indexes #0 and #1 may be shared. Similarly, the monitoring windows of the SS/PBCH blocks with indexes #2 and #3 may be composed of slots 1 and 2, and thus the monitoring durations may overlap over one slot.

Figure 19:
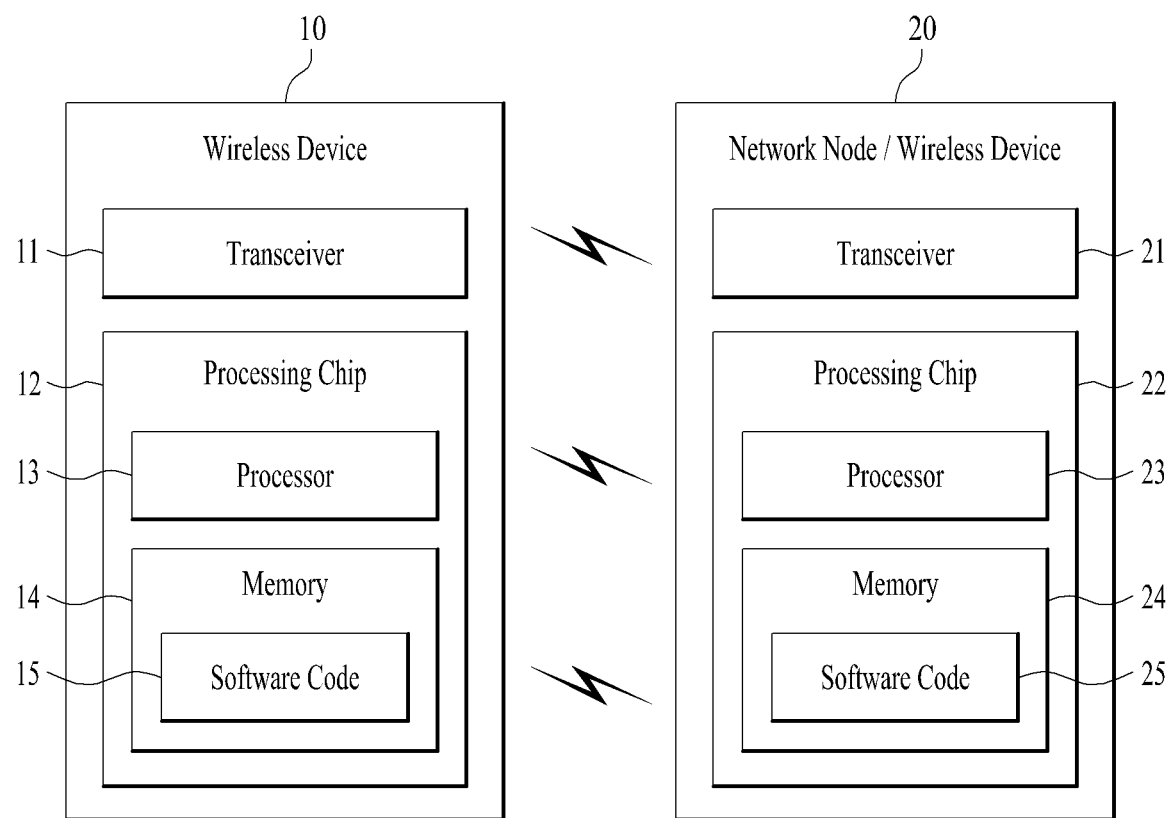
FIG. 19 is a block diagram illustrating components of a wireless device that implements the present invention.

FIG. 19 is a block diagram illustrating an example of communication between a wireless device 10 and a network node 20. Here, the network node 20 may be replaced with the wireless device of FIG. 19 or a UE.

In this specification, the wireless device 10 or the network node 20 includes a transceiver 11, 21 for communicating with one or more other wireless devices, network nodes, and/or other elements of the network. The transceivers 11 and 21 may include one or more transmitters, one or more receivers, and/or one or more communication interfaces.

In addition, the transceivers 11 and 21 may include one or more antennas. The antennas function to transmit signals processed by the transceivers 11 and 21 to the outside under control of the processing chips 12 and 22 or to receive wireless signals from the outside and transmit the signals to the processing chips 12 and 22, according to an embodiment of the present invention. The antennas are also referred to as antenna ports. Each antenna may correspond to one physical antenna or be configured by a combination of more than one physical antenna element. The signal transmitted from each antenna may not be further divided by the wireless device 10 or the network node 20. A reference signal (RS) transmitted for the corresponding antenna defines the antenna from the perspective of the wireless device 10 or the network node 20 and enables the wireless device 10 or the network node 20 to perform channel estimation for the antenna regardless of whether the channel is a single wireless channel from one physical antenna or a composite channel from a plurality of physical antenna elements including the antenna. That is, an antenna is defined such that a channel for delivering a symbol on the antenna may be derived from the channel through which another symbol on the same antenna is transmitted. A transceiver supporting a multi-input multi-output (MIMO) function to transmit and receive data using a plurality of antennas may be connected to two or more antennas.

In the present invention, the transceivers 11 and 21 may support reception beamforming and transmission beamforming. For example, in the present invention, the transceivers 11 and 21 may be configured to perform the functions illustrated in FIGS. 8 to 10.

In addition, the wireless device 10 or the network node 20 includes a processing chip 12, 22. The processing chips 12 and 22 may include at least one processor, such as a processor 13, 23, and at least one memory device, such as a memory 14, 24.

The processing chips 12 and 22 may control at least one of the methods and/or processes described herein. In other words, the processing chips 12 and 22 may be configured to implement at least one of the embodiments described herein.

The processors 13 and 23 include at least one processor for performing the function of the wireless device 10 or the network node 20 described herein.

For example, one or more processors may control the one or more transceivers 11 and 21 of FIG. 19 to transmit and receive information.

The processors 13 and 23 included in the processing chips 12 and 22 perform predetermined coding and modulation on signals and/or data to be transmitted to the outside of the wireless device 10 or the network node 20, and then transmit the signals and/or data to the transceivers 11 and 21. For example, the processors 13 and 23 convert a data sequence to be transmitted into K layers through demultiplexing, channel coding, scrambling, and modulation processes. The coded data sequence is also referred to as a code word and is equivalent to a transport block, which is a data block provided by the MAC layer. One transport block (TB) is coded into one code word, and each code word is transmitted to a reception device in the form of one or more layers. To perform frequency up-conversion, the transceivers 11 and 21 may include an oscillator. The transceivers 11 and 21 may include Nt transmit antennas (where Nt is a positive integer greater than or equal to 1).

In addition, the processing chips 12 and 22 include a memory 14, 24 configured to store data, programmable software code, and/or other information for implementing the embodiments described herein.

In other words, in the embodiments according to the present invention, when the memories 14 and 24 are executed by at least one processor, such as the processors 13 and 23, the memories allow the processors 13 and 23 to execute some or all of the processes controlled by the processors 13 and 23 of FIG. 19, or store software codes 15 and 25 including instructions for implementing the embodiments described herein based on FIGS. 1 to 18.

Specifically, the processing chip 12 of the wireless device 10 according to an embodiment of the present invention performs a control operation to receive one or more SS/PBCH blocks within a 5 ms window. The processing chip 12 may obtain RMSI CORESET configuration information through a PBCH payload, i.e., a master information block (MIB), included in the received SS/PBCH block. Here, the RMSI CORESET configuration information includes information related to a monitoring window of an RMSI PDCCH for receiving the RMSI PDCCH corresponding to the received SS/PBCH.

Through the information related to the obtained RMSI PDCCH monitoring window, the processing chip 12 may recognize at least one of a period and a duration of the RMSI PDCCH monitoring window, the corresponding SS/PBCH block, and an offset of the RMSI PDCCH monitoring window. Here, the monitoring windows of SS/PBCH blocks with consecutive indexes may at least partially overlap each other. In particular, when one RMSI CORESET is included in one slot, the monitoring windows of SS/PBCH blocks having consecutive indexes may partially overlap each other. When two RMSI CORESETs are included in one slot, the monitoring windows of SS/PBCH blocks having consecutive indexes may partially or completely overlap each other. For example, when two RMSI CORESETs are included in one slot, the monitoring window of SS/PBCH #0 and the monitoring window of SS/PBCH #1 may completely overlap each other, but the monitoring window of SS/PBCH #1 and the monitoring window of SS/PBCH #2 may partially overlap each other. The period of the RMSI PDCCH monitoring window may be the same as the default transmission period of the SS/PBCH block, and the duration of the RMSI PDCCH monitoring window may be selected from among 1 slot, 2 slots, or 4 slots.

Thereafter, the processing chip 12 monitors the RMSI PDCCH of the SS/PBCH block in the RMSI PDCCH monitoring window and performs a control operation to receive the RMSI PDCCH. The processing chip 12 performs a control operation to receive the RMSI through the PDSCH scheduled by the RMSI PDCCH.

In addition, the processing chip 22 of the network node 20 according to the embodiment of the present invention places RMSI CORESET configuration information in the PBCH payload, i.e., the MIB. The RMSI CORESET configuration information includes information related to an RMSI PDCCH monitoring window including at least one of a period and a duration of the RMSI PDCCH monitoring window, the corresponding SS/PBCH block, and an offset of the RMSI PDCCH monitoring window.

At least one of the period and duration of the RMSI PDCCH monitoring window, the corresponding SS/PBCH block, and the offset of the RMSI PDCCH monitoring window may be obtained from the information related to the RMSI PDCCH monitoring window. The monitoring windows of SS/PBCH blocks with consecutive indexes may at least partially overlap each other. In particular, when one RMSI CORESET is included in one slot, the monitoring windows of SS/PBCH blocks having consecutive indexes may partially overlap each other. When two RMSI CORESETs are included in one slot, the monitoring windows of SS/PBCH blocks having consecutive indexes may partially or completely overlap each other. For example, when two RMSI CORESETs are included in one slot, the monitoring window of SS/PBCH #0 and the monitoring window of SS/PBCH #1 may completely overlap each other, but the monitoring window of SS/PBCH #1 and the monitoring window of SS/PBCH #2 may partially overlap each other. The period of the RMSI PDCCH monitoring window may be the same as the default transmission period of the SS/PBCH block, and the duration of the RMSI PDCCH monitoring window may be selected from among 1 slot, 2 slots, or 4 slots.

Thereafter, the processing chip 22 performs a control operation to transmit one or more SS/PBCH blocks including the PBCH to the UE within a 5 ms window. In addition, the processing chip 22 performs a control operation to transmit an RMSI PDCCH corresponding to the SS/PBCH block in the RMSI PDCCH monitoring window and performs a control operation to transmit the RMSI through the PDSCH scheduled by the RMSI PDCCH.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

A specific operation described as performed by a BS may be performed by an upper node of the B S. Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

Although a method and apparatus for transmitting and receiving system information have been described with reference to examples in which the method and apparatus are applied to the fifth-generation NewRAT system, the method and apparatus are also applicable to various wireless communication systems other than the fifth-generation NewRAT system.

The invention claimed is:

1. A method of receiving remaining minimum system information (RMSI) by a user equipment (UE) in a wireless communication system, the method comprising:
receiving at least one synchronization signal (SS)/physical broadcast channel (PBCH) block (SS/PBCH block) comprising an SS and a PBCH in a half-frame;
obtaining, via the PBCH, information related to a monitoring window for receiving a physical downlink control channel (PDCCH);
determining a starting slot for the monitoring window, wherein the monitoring window has a duration of 2 slots;
receiving the PDCCH within the monitoring window; and
receiving the RMSI based on the PDCCH,
wherein based on at most 1 control resource set (CORESET) for the RMSI being included per slot, and based on the at least one SS/PBCH block having an SS/PBCH block index n which is a non-negative integer: the starting slot of the monitoring window is different for each value of the SS/PBCH block index n, and
wherein based on at most 2 CORESETs for the RMSI being included per slot:
based on the at least one SS/PBCH block having an SS/PBCH block index 2n, the starting slot of the monitoring window is a first starting slot,
based on the at least one SS/PBCH block having an SS/PBCH block index 2n+1, the starting slot of the monitoring window is the first starting slot,
based on the at least one SS/PBCH block having an SS/PBCH block index 2n+2, the starting slot of the monitoring window is a second starting slot that is 1 slot after the first starting slot, and
based on the at least one SS/PBCH block having an SS/PBCH block index 2n+3, the starting slot of the monitoring window is the second starting slot.

2. The method of claim 1, wherein a repetition transmission period of the monitoring window is identical to a transmission period of the at least one SS/PBCH block.

3. The method of claim 1, wherein the monitoring window based on the at least one SS/PBCH block having an SS/PBCH block index 2n completely overlaps with the monitoring window based on the at least one SS/PBCH block having an SS/PBCH block index 2n+1.

4. The method of claim 1, wherein the monitoring window based on the at least one SS/PBCH block having an SS/PBCH block index 2n+1 partially overlaps with the monitoring window based on the at least one SS/PBCH block having an SS/PBCH block index 2n+2.

5. The method of claim 1, wherein the monitoring window based on the at least one SS/PBCH block having an SS/PBCH block index 2n+2 completely overlaps with the monitoring window based on the at least one SS/PBCH block having an SS/PBCH block index 2n+3.

6. The method of claim 1, wherein each slot comprises a plurality of Orthogonal Frequency Division Multiplexing (OFDM) symbols.

7. The method of claim 6, wherein the half-frame comprises a plurality of slots.

8. The method of claim 1, wherein based on the at most 1 CORESET for the RMSI being included per slot:
based on the at least one SS/PBCH block having an SS/PBCH block index n, the starting slot of the monitoring window is a third starting slot; and
based on the at least one SS/PBCH block having an SS/PBCH block index n+1, the starting slot of the monitoring window is a fourth starting slot that is 1 slot after the third starting slot.

9. A user equipment (UE) configured to receive remaining minimum system information (RMSI) in a wireless communication system, the UE comprising:
at least one transceiver;
at least one processor; and
at least one computer memory operably connectable to the at least one processor and storing instructions that, when executed by the at least one processor, perform operations comprising:
receiving, through the at least one transceiver, at least one synchronization signal (SS)/physical broadcast channel (PBCH) block (SS/PBCH block) comprising an SS and a PBCH in a half-frame;
obtaining, via the PBCH, information related to a monitoring window for receiving a physical downlink control channel (PDCCH);
determining a starting slot for the monitoring window, wherein the monitoring window has a duration of 2 slots;
receiving, through the at least one transceiver, the PDCCH within the monitoring window; and
receiving the RMSI based on the PDCCH,
wherein based on at most 1 control resource set (CORESET) for the RMSI being included per slot, and based on the at least one SS/PBCH block having an SS/PBCH block index n which is a non-negative integer: the starting slot of the monitoring window is different for each value of the SS/PBCH block index n, and wherein based on at most 2 CORESETs for the RMSI being included per slot:
- based on the at least one SS/PBCH block having an SS/PBCH block index 2n, the starting slot of the monitoring window is a first starting slot,
- based on the at least one SS/PBCH block having an SS/PBCH block index 2n+1, the starting slot of the monitoring window is the first starting slot,
- based on the at least one SS/PBCH block having an SS/PBCH block index 2n+2, the starting slot of the monitoring window is a second starting slot that is 1 slot after the first starting slot, and
- based on the at least one SS/PBCH block having an SS/PBCH block index 2n+3, the starting slot of the monitoring window is the second starting slot.

10. The UE of claim 9, wherein a repetition transmission period of the monitoring window is identical to a transmission period of the at least one SS/PBCH block.

11. The UE of claim 9, wherein the monitoring window based on the at least one SS/PBCH block having an SS/PBCH block index 2n completely overlaps with the monitoring window based on the at least one SS/PBCH block having an SS/PBCH block index 2n+1.

12. The UE of claim 9, wherein the monitoring window based on the at least one SS/PBCH block having an SS/PBCH block index 2n+1 partially overlaps with the monitoring window based on the at least one SS/PBCH block having an SS/PBCH block index 2n+2.

13. The UE of claim 9, wherein the monitoring window based on the at least one SS/PBCH block having an SS/PBCH block index 2n+2 completely overlaps with the monitoring window based on the at least one SS/PBCH block having an SS/PBCH block index 2n+3.

14. The UE of claim 9, wherein each slot comprises a plurality of Orthogonal Frequency Division Multiplexing (OFDM) symbols.

15. The UE of claim 14, wherein the half-frame comprises a plurality of slots.

16. At least one non-transitory computer-readable storage medium encoded with at least one computer program comprising instructions that, when executed, operate to cause at least one processor to perform operations comprising:
- receiving at least one synchronization signal (SS)/physical broadcast channel (PBCH) block (SS/PBCH block) comprising an SS and a PBCH in a half-frame;
- obtaining, via the PBCH, information related to a monitoring window for receiving a physical downlink control channel (PDCCH);
- determining a starting slot for the monitoring window, wherein the monitoring window has a duration of 2 slots;
- receiving the PDCCH within the monitoring window; and
- receiving remaining minimum system information (RMSI) based on the PDCCH, wherein based on at most 1 control resource set (CORESET) for the RMSI being included per slot, and based on the at least one SS/PBCH block having an SS/PBCH block index n which is a non-negative integer: the starting slot of the monitoring window is different for each value of the SS/PBCH block index n, and wherein based on at most 2 CORESETs for the RMSI being included per slot:
- based on the at least one SS/PBCH block having an SS/PBCH block index 2n, the starting slot of the monitoring window is a first starting slot,
- based on the at least one SS/PBCH block having an SS/PBCH block index 2n+1, the starting slot of the monitoring window is the first starting slot,
- based on the at least one SS/PBCH block having an SS/PBCH block index 2n+2, the starting slot of the monitoring window is a second starting slot that is 1 slot after the first starting slot, and
- based on the at least one SS/PBCH block having an SS/PBCH block index 2n+3, the starting slot of the monitoring window is the second starting slot.

17. The at least one non-transitory computer-readable storage medium of claim 16, wherein a repetition transmission period of the monitoring window is identical to a transmission period of the at least one SS/PBCH block.

18. The at least one non-transitory computer-readable storage medium of claim 16, wherein the monitoring window based on the at least one SS/PBCH block having an SS/PBCH block index 2n completely overlaps with the monitoring window based on the at least one SS/PBCH block having an SS/PBCH block index 2n+1.

19. The at least one non-transitory computer-readable storage medium of claim 16, wherein the monitoring window based on the at least one SS/PBCH block having an SS/PBCH block index 2n+1 partially overlaps with the monitoring window based on the at least one SS/PBCH block having an SS/PBCH block index 2n+2.

20. The at least one non-transitory computer-readable storage medium of claim 16, wherein the monitoring window based on the at least one SS/PBCH block having an SS/PBCH block index 2n+2 completely overlaps with the monitoring window based on the at least one SS/PBCH block having an SS/PBCH block index 2n+3.

* * * * *